US011609051B2

(12) United States Patent
Curtis

(10) Patent No.: US 11,609,051 B2
(45) Date of Patent: Mar. 21, 2023

(54) APPARATUS FOR COOLING LIQUID AND COLLECTION ASSEMBLY THEREFOR

(71) Applicant: Harold D. Curtis Revocable Trust, Oklahoma City, OK (US)

(72) Inventor: Harold D. Curtis, Oklahoma City, OK (US)

(73) Assignee: Harold D. Revocable Trust, Oklahoma City, OK (US)

( * ) Notice: Subject to any disclaimer, the term of this patent is extended or adjusted under 35 U.S.C. 154(b) by 232 days.

(21) Appl. No.: 17/109,979

(22) Filed: Dec. 2, 2020

(65) Prior Publication Data

US 2021/0318083 A1  Oct. 14, 2021

Related U.S. Application Data

(63) Continuation-in-part of application No. 16/847,316, filed on Apr. 13, 2020.

(51) Int. Cl.
| | |
|---|---|
| *F28F 25/04* | (2006.01) |
| *F28C 1/02* | (2006.01) |
| *F28F 25/00* | (2006.01) |
| *F28C 1/00* | (2006.01) |

(52) U.S. Cl.
CPC ............ *F28F 25/04* (2013.01); *F28C 1/02* (2013.01); *F28C 2001/006* (2013.01); *F28F 2025/005* (2013.01)

(58) Field of Classification Search
CPC ....... F28C 1/02; F28C 2001/006; F28F 25/04; F28F 2025/005
USPC ........................................ 261/108, 97, 110
See application file for complete search history.

(56) References Cited

U.S. PATENT DOCUMENTS

| | | | |
|---|---|---|---|
| 965,116 | A | 7/1910 | Morison |
| 1,647,281 | A | 11/1927 | Doyle |
| 1,803,854 | A | 5/1931 | Kniskern |
| 1,866,193 | A | 7/1932 | Coutant |
| 2,606,750 | A | 8/1952 | Jacir |
| 3,217,631 | A | 11/1965 | Thompson et al. |
| 3,290,025 | A | 12/1966 | Engalitcheff, Jr. |
| 3,384,165 | A | 5/1968 | Mathews |
| 3,402,653 | A | 9/1968 | Lex |
| 3,647,191 | A | 3/1972 | Fordyce |
| 3,750,418 | A | 8/1973 | Maudlin |
| 3,803,997 | A | 4/1974 | Van Raden |

(Continued)

FOREIGN PATENT DOCUMENTS

| | | |
|---|---|---|
| CN | 103411471 | 11/2013 |
| DE | 2606429 A1 | 9/1977 |

(Continued)

*Primary Examiner* — Charles S Bushey
(74) *Attorney, Agent, or Firm* — Dunlap Codding, P.C.

(57) ABSTRACT

A liquid collection assembly positionable between a fill material and a fan of a cooling tower for collecting liquid gravitating through the fill material while allowing air to pass up to the fill material. The liquid collection assembly includes a plurality of trough assemblies supported in a spaced apart, vertically overlapping relationship to provide a uniform path for rising air, to capture the down flowing liquid, to provide a barrier between the liquid distribution system and the fan, and to carry the liquid into the at least one gutter. The trough assemblies are supported by a first end plate and a second end plate through which trough assemblies extend.

18 Claims, 14 Drawing Sheets

(56) References Cited

U.S. PATENT DOCUMENTS

| | | |
|---|---|---|
| 3,834,129 A | 9/1974 | Darlinger et al. |
| 3,968,738 A | 7/1976 | Matzke |
| 4,014,669 A | 3/1977 | Thompson et al. |
| 4,164,399 A | 8/1979 | Kannapell |
| 4,196,157 A | 4/1980 | Schinner |
| 4,198,215 A | 4/1980 | Regehr |
| 4,273,733 A | 6/1981 | Kals |
| 4,385,010 A | 5/1983 | Bosne |
| 4,416,835 A | 11/1983 | Bosne |
| 4,500,330 A | 2/1985 | Bradley, Jr. et al. |
| 4,521,350 A | 6/1985 | Lefevre |
| 4,759,315 A | 7/1988 | Chiou et al. |
| 4,981,113 A | 1/1991 | Kannan et al. |
| 5,000,883 A | 3/1991 | Leva |
| 5,227,095 A | 7/1993 | Curtis |
| 5,268,011 A | 12/1993 | Wurz |
| 5,464,573 A | 11/1995 | Tokerud et al. |
| 5,474,832 A | 12/1995 | Massey |
| 5,487,531 A | 1/1996 | Curtis |
| 5,545,356 A | 8/1996 | Curtis |
| 5,958,306 A | 9/1999 | Curtis |
| 6,527,258 B2 | 3/2003 | Bartlok |
| 8,585,024 B2 | 11/2013 | Ferree et al. |
| 9,033,318 B2 | 5/2015 | Curtis |
| 9,273,915 B2 | 3/2016 | Patel |
| 9,562,729 B2 * | 2/2017 | Curtis ................. F28D 5/02 |
| 9,644,904 B2 | 5/2017 | Curtis |
| 9,897,399 B2 | 2/2018 | Kroger et al. |
| 10,677,543 B2 | 6/2020 | Auth et al. |
| 11,029,059 B2 | 6/2021 | Towner et al. |
| 2001/0038155 A1 | 11/2001 | Bachmann et al. |
| 2006/0021393 A1 | 2/2006 | Oda et al. |
| 2007/0187851 A1 | 8/2007 | Facius et al. |
| 2011/0049733 A1 | 3/2011 | Ferree et al. |
| 2011/0315350 A1 * | 12/2011 | Curtis ................. F28D 5/02 165/104.21 |
| 2014/0361450 A1 | 12/2014 | Curtis |
| 2015/0330710 A1 | 11/2015 | Curtis |
| 2016/0146540 A1 | 5/2016 | Curtis |
| 2017/0146297 A1 | 5/2017 | Curtis |
| 2019/0143242 A1 | 5/2019 | Kanzler |
| 2020/0256629 A1 * | 8/2020 | Auth ............... F28D 1/05316 |

FOREIGN PATENT DOCUMENTS

| | | |
|---|---|---|
| EP | 0931993 A1 | 7/1999 |
| JP | S51-125666 A | 11/1976 |
| JP | 55159804 | 12/1980 |
| JP | H08145596 | 6/1996 |
| JP | H09-89493 A | 4/1997 |
| JP | H10-220972 A | 8/1998 |
| JP | 2000-130800 A | 5/2000 |
| JP | 2002-370518 A | 12/2002 |
| JP | 2003-314972 A | 11/2003 |
| JP | 2004-232925 A | 8/2004 |
| JP | 2008-292065 A | 12/2008 |
| JP | 2009-002528 A | 1/2009 |
| WO | 99/19055 A1 | 4/1999 |
| WO | 2004/072569 A1 | 8/2004 |
| WO | 2009/070691 A1 | 6/2009 |

\* cited by examiner

APPARATUS FOR COOLING LIQUID AND COLLECTION ASSEMBLY THEREFOR

CROSS-REFERENCE TO RELATED APPLICATIONS AND INCORPORATION BY REFERENCE STATEMENT

This application is a continuation-in-part of U.S. application Ser. No. 16/847,316, filed on Apr. 13, 2020, the entire contents of which is hereby expressly incorporated herein by reference.

BACKGROUND

Conventional types of industrial cooling towers include counterflow towers wherein water or other liquid falls or is sprayed downward in the tower counter to air moving upwardly in the tower. Such systems are used for many applications including water air scrubbers, dust collection equipment, air cooling towers, evaporative coolers, fluid coolers or closed loop cooling towers, evaporative condensers or the like. Typically, such industrial cooling towers are large and permanent installations which include large bottom sumps to collect the falling water.

Some relatively small towers for such purposes have been built which are transportable, for various applications, such as small rooftop towers. For example, U.S. Pat. Nos. 5,227,095 and 5,487,531, issued to Harold D. Curtis, disclose individual modular towers of a size that can be readily transported, prefabricated at a factory, and then easily assembled at a field site to provide the capacity required by the particular water/liquid cooling or treatment project at the site. The systems disclosed in the Curtis patents have a fan or fans for supplying air to the tower in the bottom of the tower below the fill, evaporative cooling media, or liquid cooling coils. The fans force air directly upward in the tower. These systems are referred to generally as direct forced draft counter flow cooling towers.

Each system uses a large water or liquid collection basin, sump or reservoir to collect and contain the circulating water for the system. These basins or sumps are typically large because they must contain enough liquid to charge the system, including all associated piping. Because the process liquid (often, but not always, water) in these systems will scrub the air and collect airborne particles, such particles will settle out in the basins, sumps or reservoirs which then have to be periodically cleaned and the large volume of liquid in the system dumped, cleaned or disposed of. Such basins, sumps and reservoirs become internal sediment basins. Such basins are maintenance intense and require workers to enter and work in a confined space to perform cleaning. Simultaneously the large volume of liquid itself may require water or chemical treatment rather than disposal, further adding to costs. The volume of liquid in such systems greatly increases the weight of the system and increases rooftop loading.

Besides the issues of sedimentation, liquid volume and disposal, proposed tower systems have not adequately addressed the problem of air diffusion by their respective liquid collection systems. Generally, cooling tower (or other forms of towers like fluid coolers) efficiency is determined by how well the up flowing air is mixed with the down coming liquid. The fans in such systems are round and the air is not evenly distributed across the tower media or elements since the fans deliver no balanced air flow. Collection systems generally include a plurality of collection troughs. Sometimes, the troughs have sloping plate member, which overlap with adjacent plate members.

These collection troughs are typically supported in the tower housing by transverse support members or plates which block or limit air dispersion through them and prevent lateral dispersion of air between them. The collection troughs are also closely spaced to reduce water falling past the collection troughs and onto the fans. The close spacing can cause significant pressure drops and thus inefficient air flow. To further reduce water reaching the fans, a damper is sometimes implemented. The damper is a plate positioned between adjacent collection troughs to block water from falling onto the fans when the fans are in an off condition. A problem encountered with dampers is they are positioned at the bottom of the collection troughs and thus susceptible to freezing, which leads to the damper becoming stuck in either the open or closed position.

SUMMARY OF THE INVENTIVE CONCEPTS

In accordance with an aspect of the inventive concepts low profile, transportable cooling towers and/or fluid coolers/closed loop cooling towers are disclosed which include a liquid collection assembly located above one or more fans in the base of the tower housing. The liquid collection assembly is positioned below the fill media in the tower or heat transfer coils of a fluid cooler. It collects the liquid flowing through the fill or heat transfer coils and directs the same to an internal gutter, from which the liquid may be removed and recirculated.

In accordance with a further aspect of the inventive concepts, a liquid collection assembly is provided that includes a plurality of trough assemblies supported in a spaced apart, vertically overlapping relationship to provide a uniform path for rising air, to capture the down flowing liquid, to provide a barrier between the liquid distribution system and the fan, and to carry the liquid into the at least one gutter.

In one embodiment, the trough assemblies comprise a trough, a liquid diverter plate, and a damper. The trough has a liquid receiving channel, a first side, a second side, a first end, a second end, and upper end, and a lower end. The liquid diverter plate has a first end, a second end, a proximal end, a distal end, an upper surface, and a lower surface. The liquid diverter plate is a separate piece from the trough, and the proximal end of the liquid diverter plate is attached to the second side of the trough with the liquid diverter plate extending upwardly and laterally away from the trough so liquid flowing onto to the upper surface flows into the trough. The distal end is positioned vertically above an adjacent one of the troughs. The damper plate extends from the second side of the trough and is movable between a closed position wherein the damper extends between the second side of the trough and the first side of the adjacent trough to cover the space between the trough and the adjacent trough and an open position wherein the damper is spaced from the adjacent trough.

The liquid collection assembly can be utilized in equipment such as water air scrubbers, dust collection equipment, cooling towers, evaporative coolers, fluid coolers, evaporative condensers and any equipment that utilizes water or any liquid fluid for scrubbing, cleaning, or evaporative cooling. Although the liquid collection assembly is described for use with low profile transportable cooling towers and/or fluid coolers, the liquid collection assembly can be used with any systems, including those having conventional bottom sumps and basins.

Besides collecting the down coming liquid, the liquid collection assembly provides a low-pressure means for the air to flow vertically up between the surface elements of the liquid collection assembly and into the cooling media or fluid cooler coil system. The trough and the liquid diverter plates are strategically configured and spaced to direct and defuse the up flowing air to enhance even airflow through the liquid collection assembly and the fill media or heat exchanger. The structure of the troughs and the liquid diverter plates, and the void of internal support structures, allow air to disperse uniformly. This creates an efficient air to liquid mixture, improving thermal performance of the heat exchanger or cooling tower. In addition, previously proposed liquid collectors have a significant pressure drop across the collector panels. The inventive concepts described herein will reduce the pressure drop as compared to the existing technology. This will further increase thermal performance of the heat exchanger or cooling tower. The liquid collection assembly can be produced much more economically than the present technology.

DETAILED DESCRIPTION OF EXEMPLARY EMBODIMENTS

Figure 1:
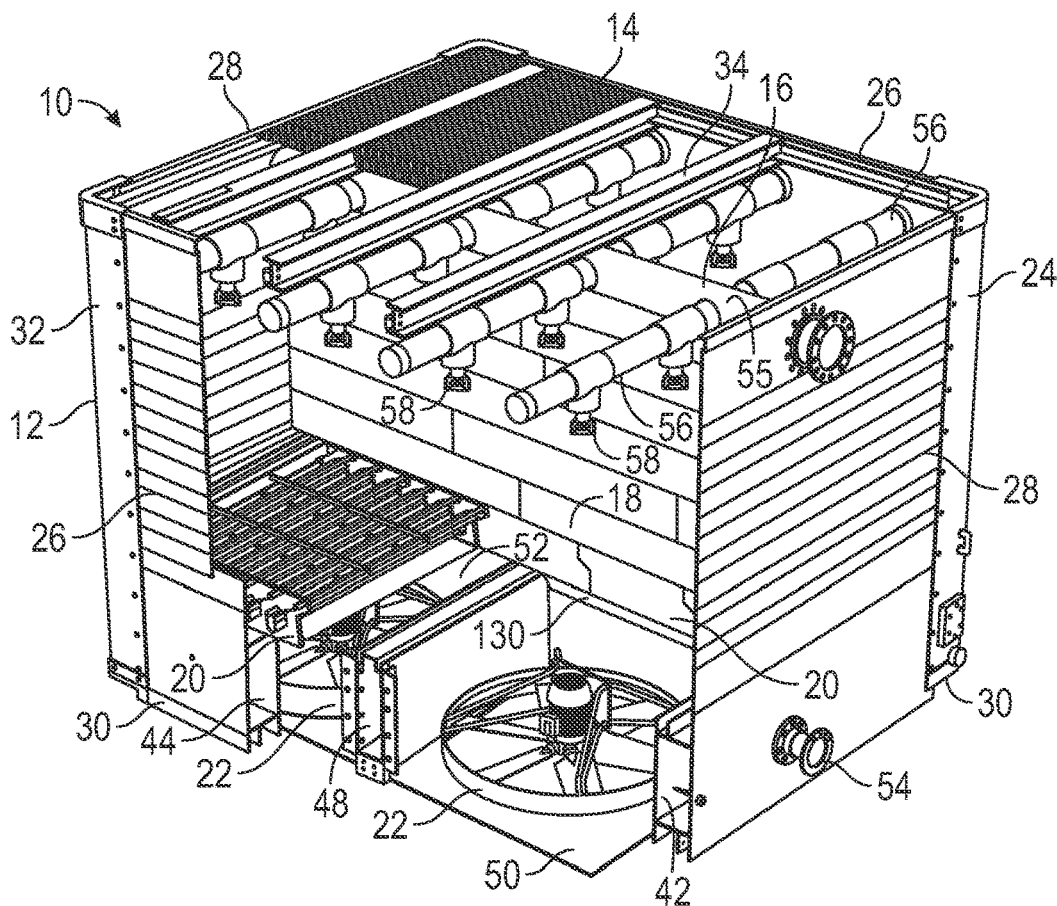
FIG. 1 is a perspective view of a cooling tower module constructed in accordance with the inventive concepts disclosed herein.
Figure 2:
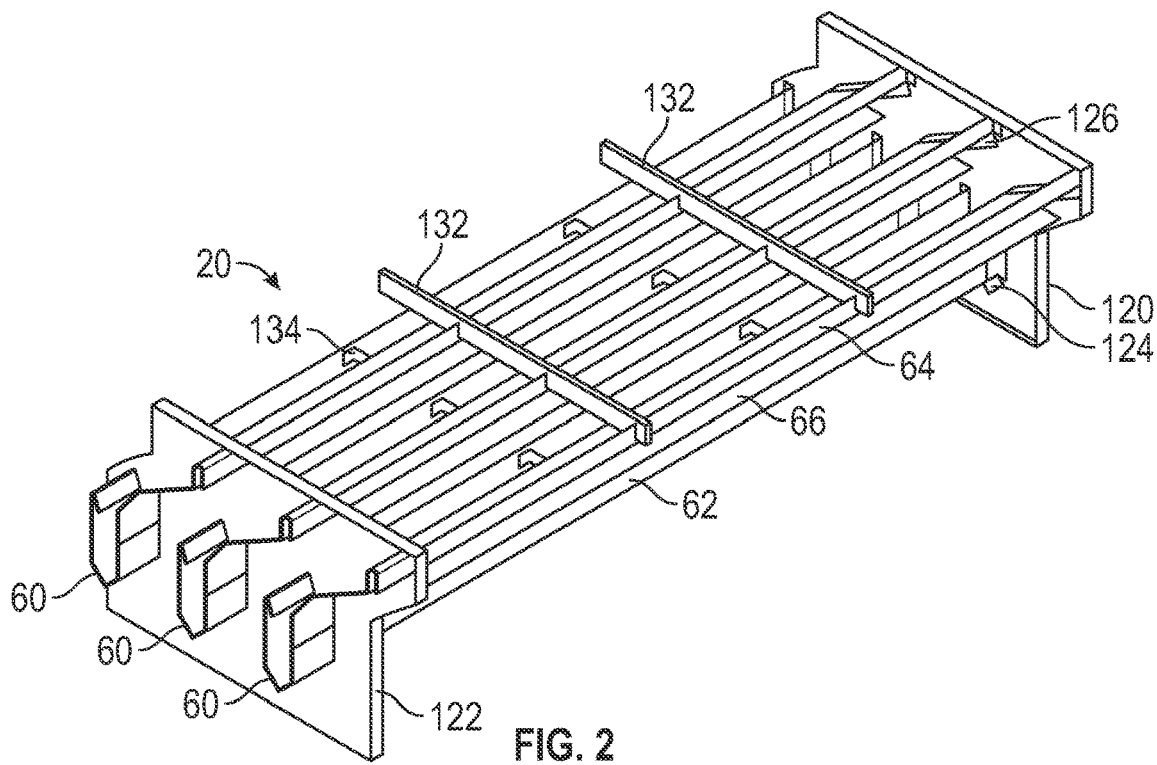
FIG. 2 is a perspective view of a liquid collection assembly constructed in accordance with the inventive concepts disclosed herein.

Before explaining at least one embodiment of the inventive concepts disclosed, it is to be understood that the inventive concepts are not limited in their application to the details of construction and the arrangement of the components or steps or methodologies in this description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Referring to the drawings, and more particularly to FIG. 1, a cooling tower module 10 constructed in accordance with the inventive concepts disclosed herein is shown. The cooling tower module 10 includes a housing assembly 12, drift eliminators 14, liquid distribution assemblies 16, fill media 18, liquid collection assemblies 20, and fan assemblies 22 for drawing air through the bottom of the housing assembly 12 and blowing it through the liquid collection assemblies 20, the fill media 18, the drift eliminators 14, and out the top of the housing assembly 12 countercurrent to the water distributed from liquid distribution assemblies 16.

Any number of cooling tower modules can be combined to form a cooling tower of desired capacity. In one embodiment, the cooling tower module 10 may be formed to a size of 6 ft. by 12 ft. by 11 ft. Each module can include two sub-modules. The sub-modules may be arranged in a side-by-side relationship and each sub-module may include a drift eliminator 14, a liquid distribution assembly 16, a fill media 18, a liquid collection assembly 20, and a fan assembly 22. The sub-modules may have a size of 6 ft. by 6 ft. by 11 ft. with each sub-module having a cooling capacity of 100 tons.

The housing assembly 12 includes a frame 24 supporting vertical side walls 26 and end walls 28. One of the side walls 26 has been partially cutaway to illustrate the interior of the cooling tower module 10. The frame 24 includes a plurality of lower horizontal beams 30, a plurality of vertical beams 32, and a plurality of upper horizontal beams 34 connected together to form a generally rectangular-shaped support frame. The beams 34 may be fabricated of any suitable material, including metal or pultruded fiberglass. When the cooling tower module 10 is combined with another cooling tower module 10, the adjacent side walls can be omitted so the cooling tower modules 10 openly communicate with one another.

The frame 24 may be supported by four legs (not shown) at the corners of the frame 24. The legs may be telescopically connected to the vertical beams 32.

The housing assembly 12 further includes a liquid collection basin 42. The liquid collection basin 42 is formed to collect water from the liquid collection assembly 20 as described below. The liquid collection basin 42 may include a first gutter 44 extending along an interior side of one of the longitudinal lower horizontal beams 30 and a second gutter (not shown) 6 extending along an interior side of the other longitudinal lower horizontal beam 30. The first gutter 44 and the second gutter may be fluidly connected with a connecting gutter 48. The first gutter 44, the second gutter, and the connecting gutter 48 cooperate to form a first fan receiving space 50 and a second fan receiving space 52. One of the first and the second gutters is provided with a liquid outlet 54. In one embodiment, the liquid outlet 54 has a flange.

In one embodiment, the liquid distribution assembly 16 includes a liquid distribution header 55 and a plurality of lateral feeder conduits 56. The liquid distribution header 55 and the lateral feeder conduits 56 may be made of any suitable material such as PVC, RFP, copper, stainless steel, aluminum, and resins, for example.

The liquid distribution assembly 16 further has a plurality of nozzle assemblies 58 connected to the lateral feeder conduits 56 and are in fluid communication with the lateral feed conduits 56. The nozzle assemblies 58 function to discharge water therethrough to obtain a uniform distribution of water over the fill media 18. The nozzle assemblies 58 may be any suitable nozzle assemblies. For example, a suitable nozzle assembly is disclosed in U.S. Publication No. 2017/0297043, which is hereby expressly incorporated herein by reference.

The drift eliminators 14 are mounted in the open top of the housing assembly 12 to intercept, trap, and collect mist blown through the housing assembly 12 to prevent the mist from escaping to the atmosphere. Drift eliminators are well known in the art and need not be described.

The fill material 18 may be any suitable fill media. In one embodiment, the fill material may be formed from a plurality of layers. For example, the fill material 18 may be corrugated plastic fill material. Like the drift eliminators, the fill media is well known in the art and need not be described.

Referring now to FIGS. 1-12 the liquid collection assembly 20 is positioned within the housing assembly 12 below the fill media 18 for collecting liquid that passes from the liquid distribution assembly 16 and through the fill media 18. As illustrated in FIGS. 1 and 3A-3C, the liquid collection assembly 20 may include a plurality of liquid collection assemblies 20 installed and removed in sections. In another version, the liquid collection assembly 20 may be formed as a single unit. Each of the liquid collection assemblies 20 includes a plurality of trough assemblies 60 supported in a spaced apart, vertically overlapping relationship to provide a path or plenum for rising air and to capture the down flowing liquid, to provide a barrier between the liquid distribution system, and the fan, and to carry the liquid into the at least one gutter.

Referring to FIGS. 4-7, the trough assemblies 60 comprise a trough 62, a liquid diverter plate 64, and a damper plate 66. The trough 62 has a liquid receiving channel 68, a first side 70, a second side 72, a first end 74, a second end 76, and upper end 78, and a lower end 80. The troughs 62 are elongated members that form channels into which liquid falls. The troughs 62 are angled so gravity is utilized to carry the liquid into one of the gutters 44 or 46. While the troughs 62 are shown to have a V-shaped bottom, the troughs 62 may be formed to have other shapes. For example, the bottom of the troughs 62 may be U-shaped.

In one embodiment, the trough 62 is bent along the upper end 78 of the second side 72 to form a hinge chamber 82, which will be described more below. The trough 62 may have a bend 84 along the upper end 78 of the first side 70 to increase structural integrity.

The liquid diverter plate 64 has a first end 86, a second end 88, a proximal end 90, a distal end 92, an upper surface 94, and a lower surface 96. In one embodiment, the liquid diverter plate 64 is a separate piece from the trough 62, and the proximal end 90 of the liquid diverter plate 64 is attached to the second side 72 of the trough 62 with the liquid diverter plate 64 extending upwardly and laterally away from the trough 62 so liquid flowing onto to the upper surface 94 flows into the liquid receiving channel 68 of the trough. It will be appreciated that in another embodiment, the liquid diverter plate 64 can be formed as a single piece with the trough 62. The distal end 92 is positioned vertically above an adjacent one of the troughs 62. The distal end 92 of the liquid diverter plate 64 has an inverted U-shape bend 98 to provide structural rigidity and to cause liquid dripping from the liquid diverter plate 64 to drop rather than travel along the lower surface 96 of the liquid diverter plate 64. An intermediate portion of the liquid diverter plate 64 has a bend 99. The proximal end 90 of the liquid diverter plate 64 is configured to be attached to the second side 72 of the trough 62 with suitable fasteners or adhesive, and the proximal end 90 of the liquid diverter plate 64 may have a bend 99a (FIG. 7) to increase structural integrity. The liquid diverter plate 64 cooperates with the trough 62 to further define a hinge trough 100 (FIG. 5) extending the length of the trough assembly 60.

The damper plate 66 extends from the second side 72 of the trough 62 and is movable between a closed position (FIG. 8A) wherein the damper plate 66 extends between the second side 72 of the trough 62 and the first side 70 of the adjacent trough 62 to cover the space between the trough 62 and the adjacent trough 62 an open position (FIG. 8B) wherein the damper plate 66 is spaced from the adjacent trough 62.

The damper plate 66 extends from the upper end 78 of the trough 62. The damper plate 66 has a proximal end 102 and a distal end 104. In one embodiment, the proximal end 102 is hinged to the second side 72 of the trough 62. By way of example, the proximal end 102 has a bend forming a hinge member 108 positioned in the hinge chamber 82. The hinge member 108 is insertable into the hinge chamber 82 and configured to hook in the hinge chamber 82.

The damper plate 66 has a longitudinal bend 110 so the damper plate 66 has an inverted V shape that conforms to the contour of the liquid diverter plate 64 when the damper plate 66 is in the open position. In the closed position, the inverted V shape allows a portion of liquid falling onto an upper side 112 of the damper plate 66 to flow into the adjacent trough 62 and another portion of liquid falling onto the upper side 112 of the damper plate 66 to flow into the hinge trough 100, which is in fluid communication with the gutter 44. The inverted V shape further reduces the radius of travel of the damper plate 66 between the closed position and the open position.

The liquid collection assembly 20 further has a first end plate 120 (FIGS. 2 and 9) attached to the first end 74 of the trough 62 and the first end 86 of the liquid diverter plate 64; and a second end plate 122 (FIGS. 2 and 10) through which the second end 76 of the trough 62 and the second end 88 of the liquid diverter plate 64 extend. The first end plate 120 is provided with a series of trough brackets 124 and liquid diverter plate brackets 126. The first end 74 of the troughs 62 are supported by the trough brackets 124 and the first end 86 of the liquid diverter plates 64 are supported by the liquid diverter plate brackets 126. The first end 74 of the troughs 62 and the first end 86 of the liquid diverter plates 64 are fluidically sealed relative to the first end plate 120 with a suitable sealant and may be secured to the trough brackets and the liquid diverter plate brackets 126 with fasteners, such as rivets.

The second end plate 122 has a plurality of openings 128 corresponding to the profile of the liquid receiving channels of the troughs and the liquid diverter plates 64. The troughs 62 and the liquid diverter plates 64 are secured to the second end plate 122 with suitable fasteners and/or fluid sealant or adhesive so liquid flowing along the liquid receiving channels 68 and the hinge trough 100 passes through the second end plate 122 and into the gutter 44.

Figure 3A:
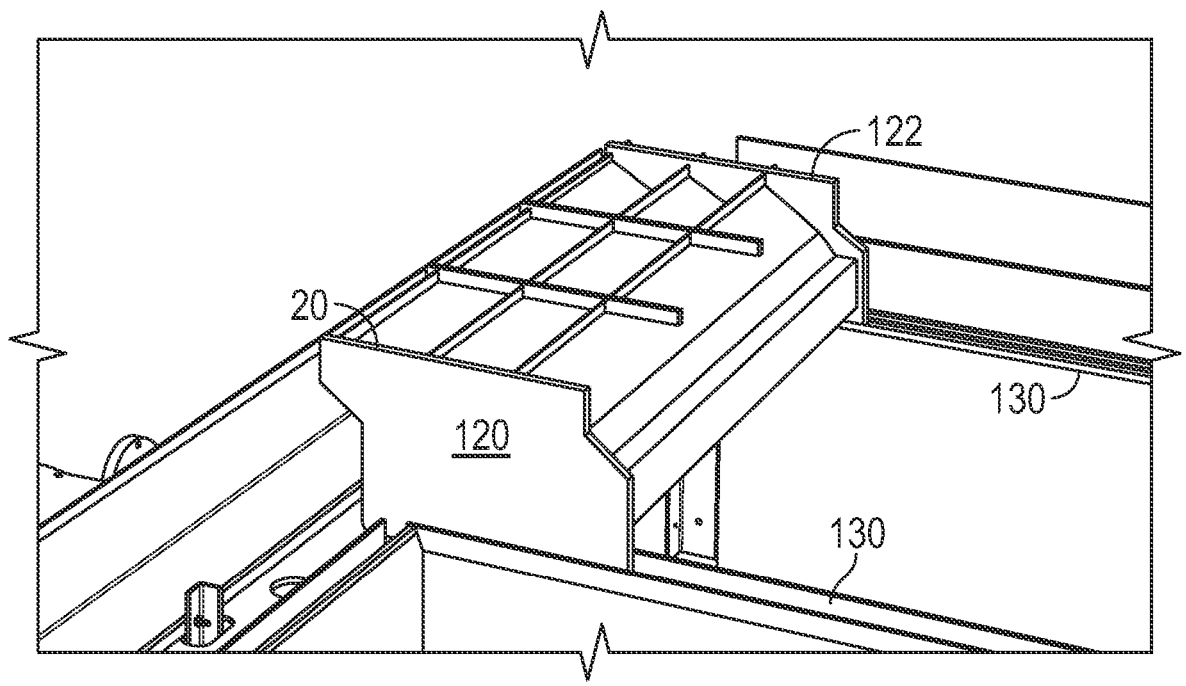
FIGS. 3A-C are perspective views of the liquid collection assembly being installed.
Figure 3B:
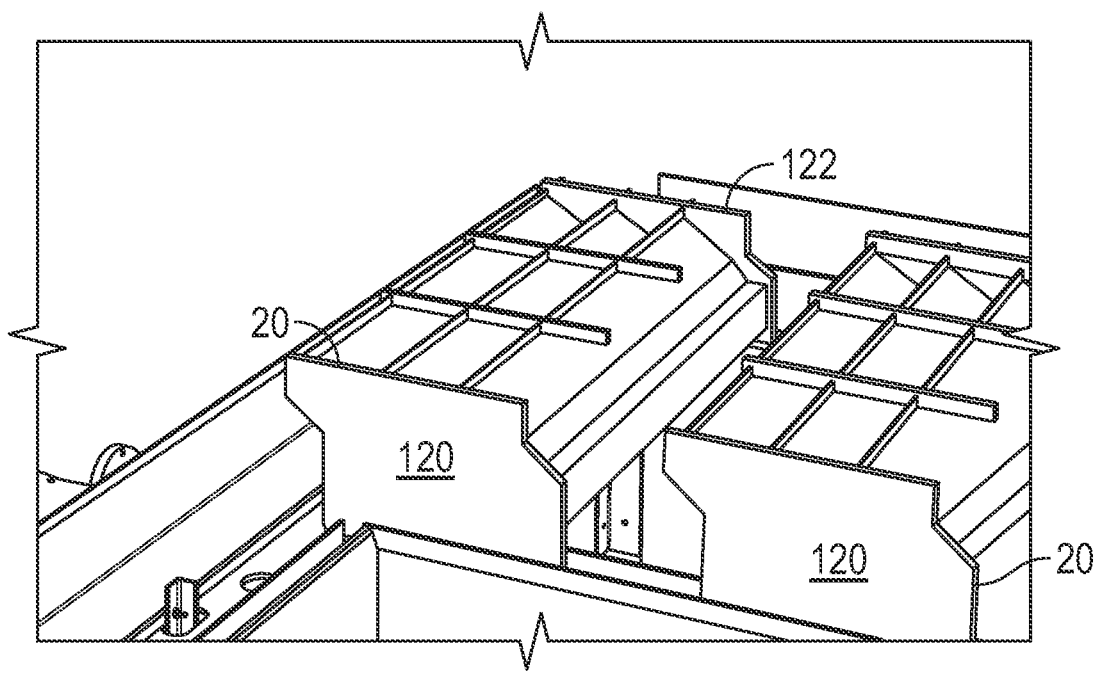
Figure 3C:
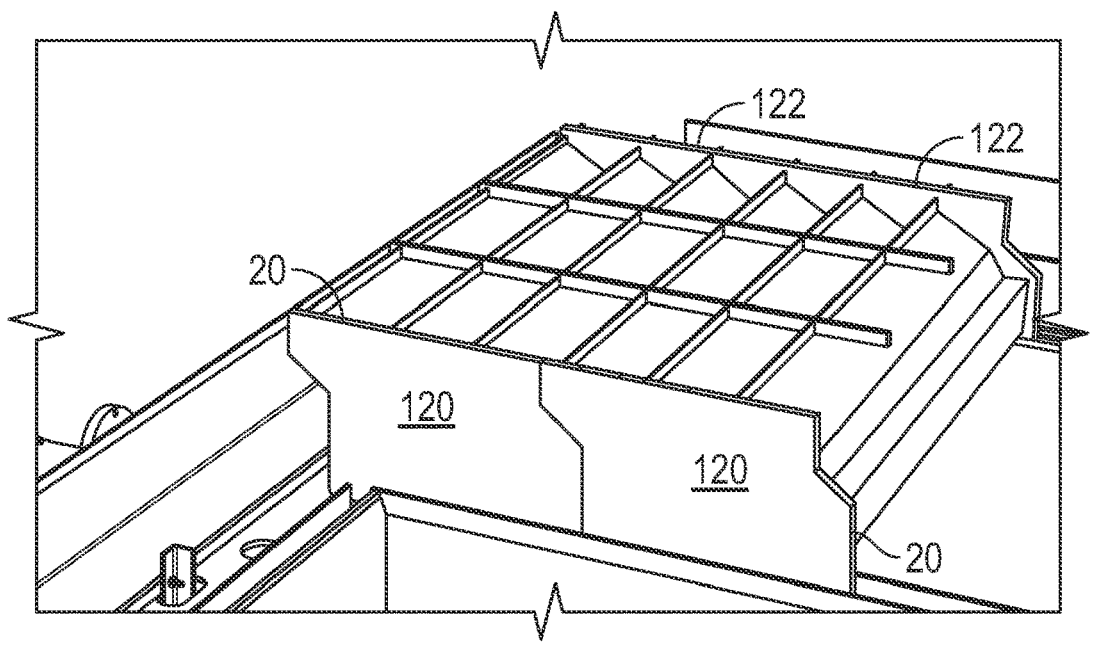
Figure 4:
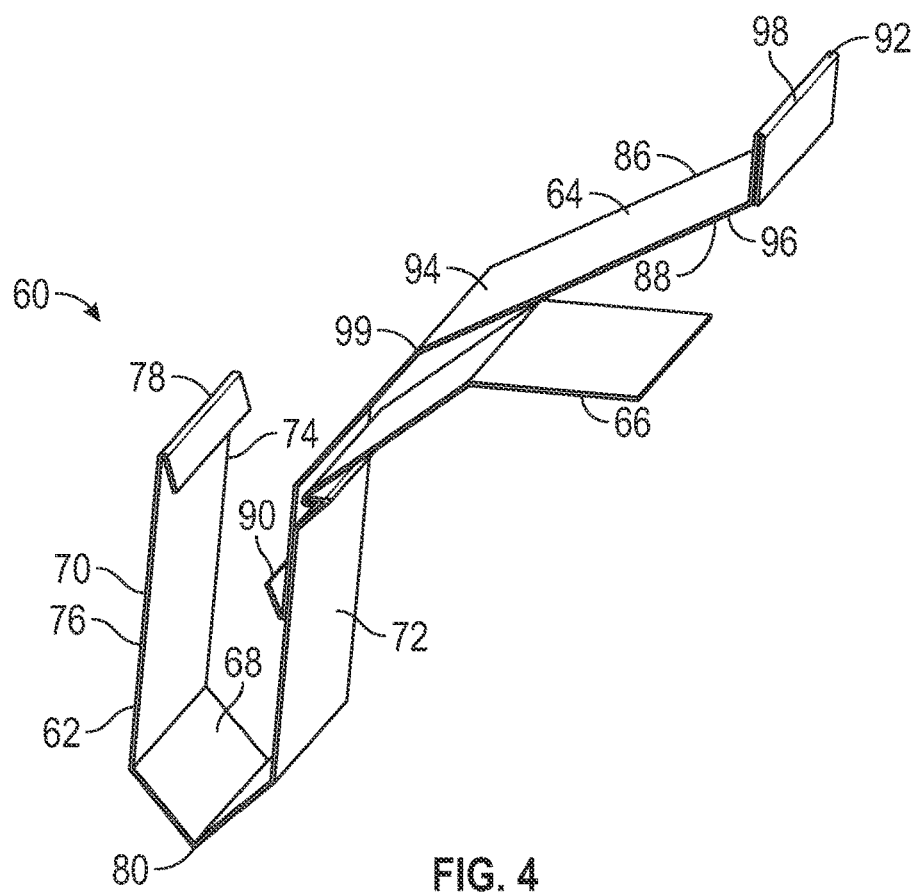
FIG. 4 is a perspective view of a trough assembly of the liquid collection assembly.
Figure 5:
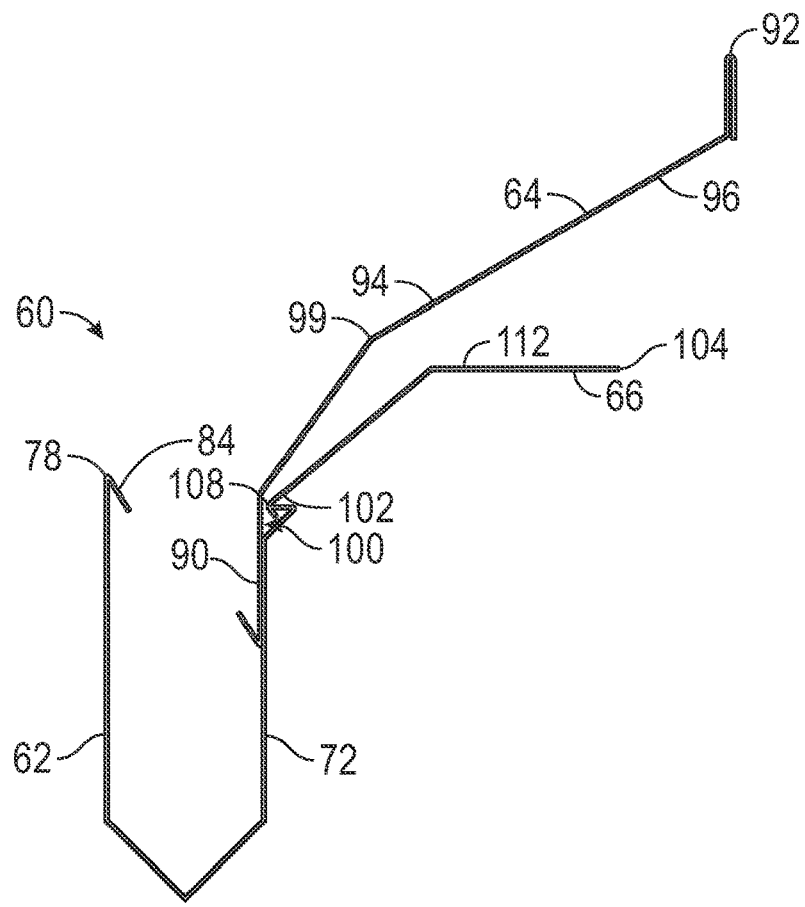
FIG. 5 is an end view of the trough assembly of FIG. 4.
Figure 6:
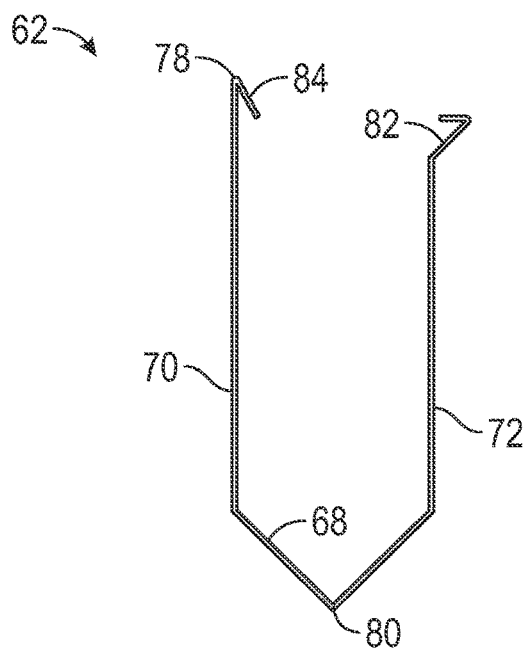
FIG. 6 is an end view of a trough.
Figure 7:
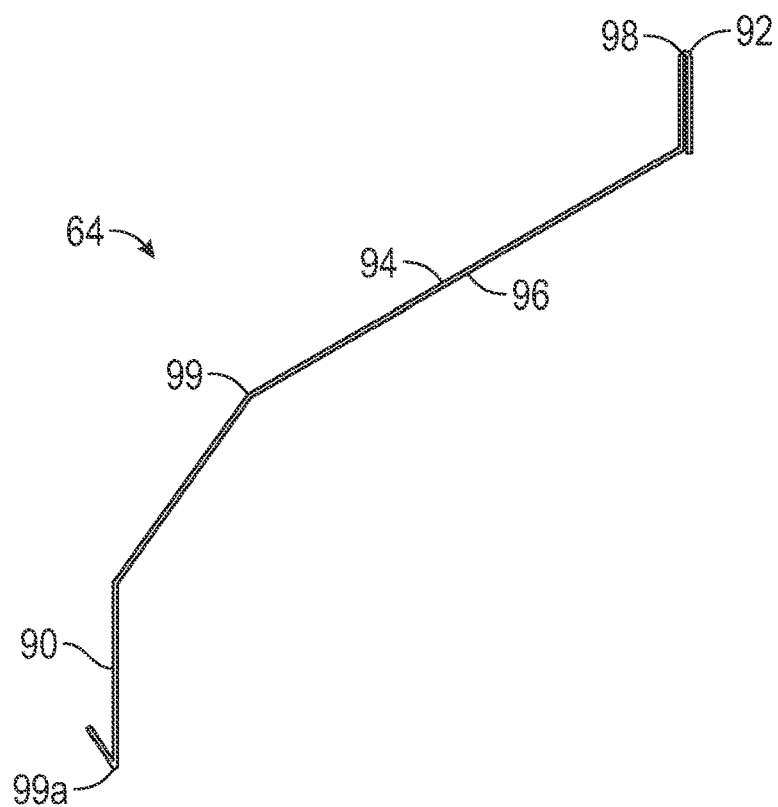
FIG. 7 is an end view of a liquid diverter plate.

The liquid collection assembly 20 is supported by the structure forming the first gutter 44 and the second gutter. As shown in FIGS. 3A-3C, the liquid collection basin 42 may be provided with parallel tracks 130 for slidingly supporting the liquid collection assembly 20.

With further reference to FIGS. 3A-3C, the edges of the end walls 120 and 122 may be configured to mate with an end wall of an adjacent liquid collection assembly when abutted with one another to form a fluid tight seal. In one embodiment, opposing edges of the end walls 120 and 122 may be provided with a tongue and groove structure (not shown) to permit adjacent sections to mate with one another.

Figure 12:
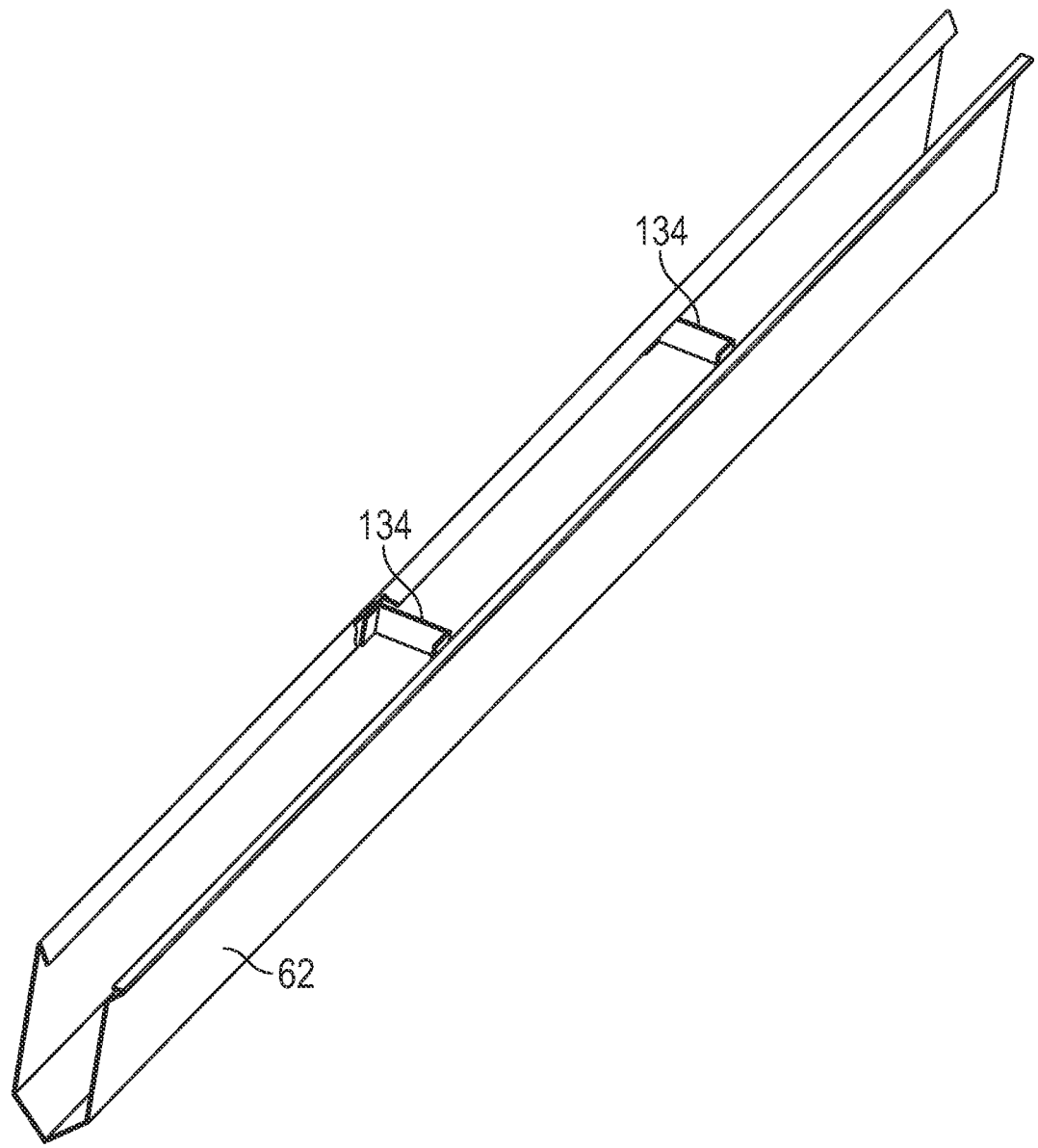
FIG. 12 is a perspective view of the trough illustrating a plurality of support members attached thereto.

Desirably, the trough assemblies 60 require no intermediate supports, which would interfere with the flow of air and liquid through the cooling tower module. Nevertheless, supports may be used. By way of example, the supports may be in the form of cross supports 132 (FIG. 11), and spacers 134 (FIG. 12). The cross supports 132 are spaced apart from one another and engage to the distal ends 92 of each of the liquid diverter plates 64 so as not to be positioned in the air path. The spacers 134 are U-shaped members positioned vertically in the troughs 62, and thus not in the air path, to provided support for the troughs 62, as needed.

The liquid collection assembly 20 defines a vertical flow passage with the trough assemblies 60 supported within the flow passage to allow air to pass from the fan assembly 22 and through the flow passage and to collect liquid falling into the flow passage and to direct the collected water to the gutter 44.

The trough 62, the liquid diverter plate 64, the damper plate 66, first and second end plates 120 and 122, the cross supports 132, and the spacers 134 may be fabricated of a metal or sufficiently rigid plastic or fiberglass material.

Figure 8A:
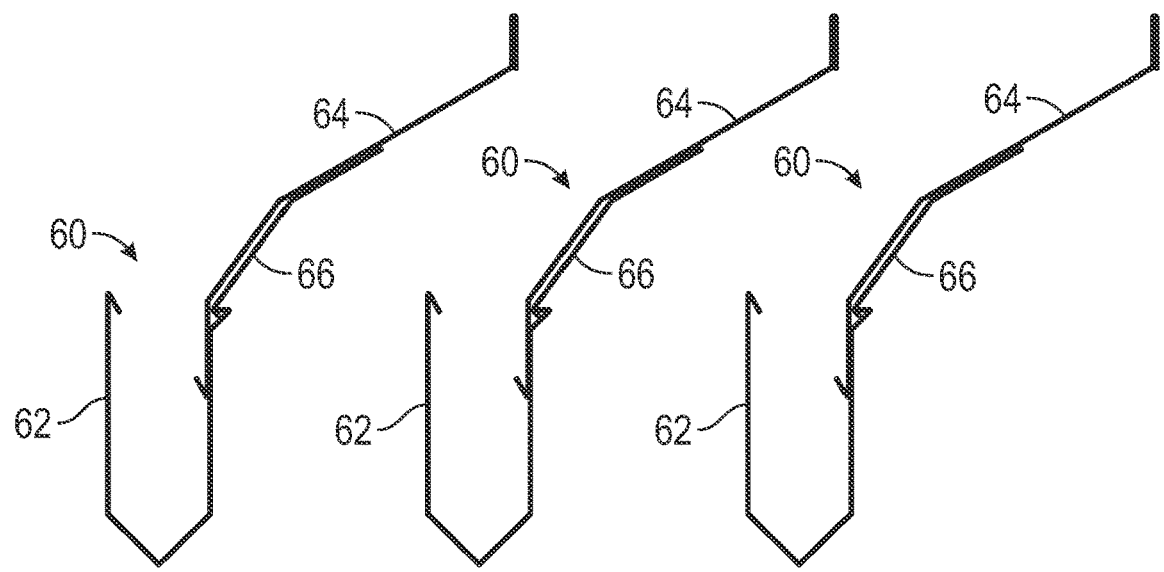
FIG. 8A is sectional view of the liquid collection assembly illustrating the damper plates of the trough assemblies in a closed position.
Figure 8B:
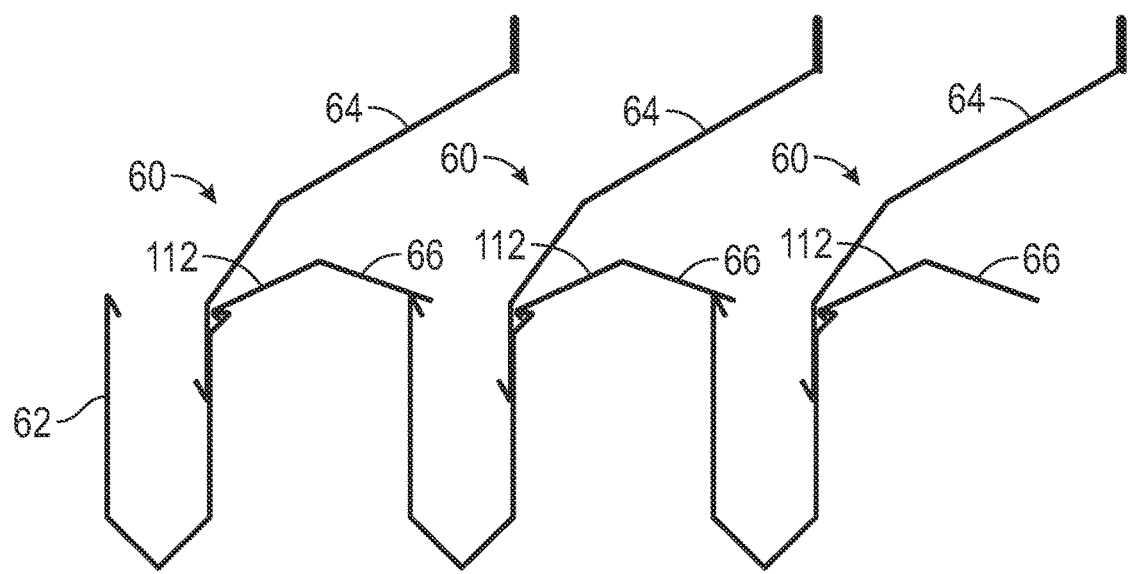
FIG. 8B is sectional view of the liquid collection assembly illustrating the damper plates of the trough assemblies in an open position.
Figure 9:
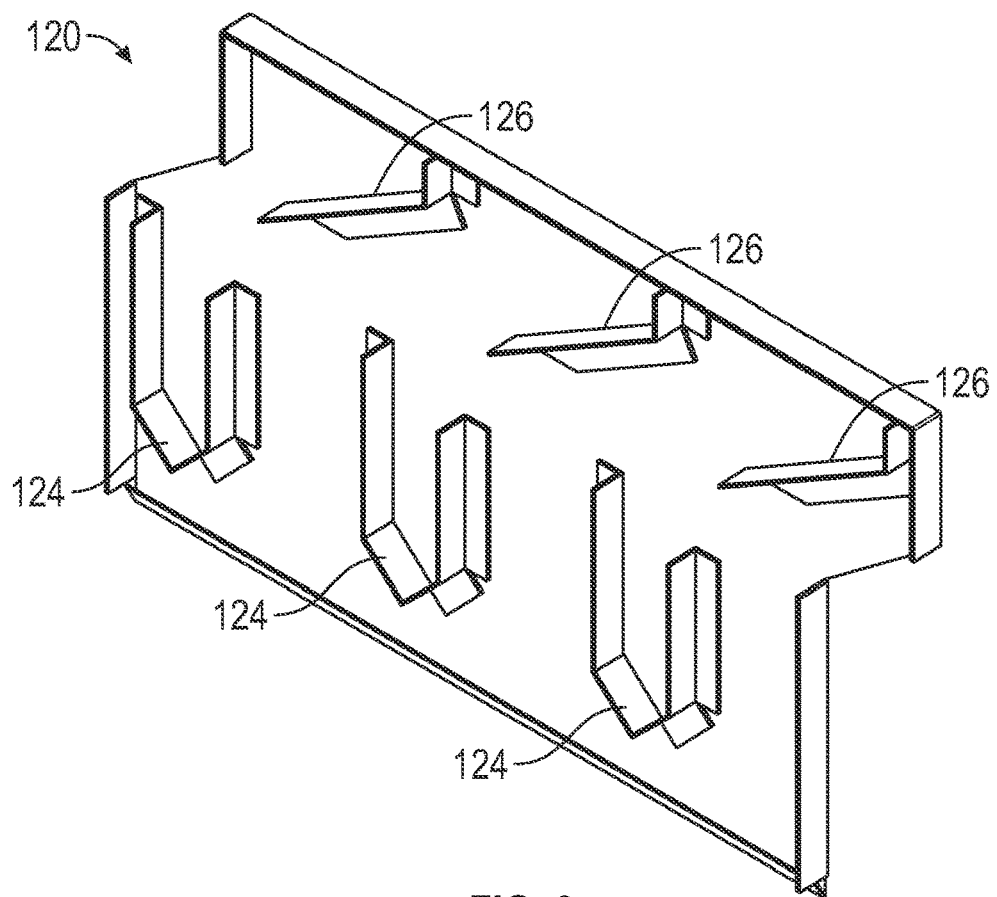
FIG. 9 is a perspective view of a first end plate of the liquid collection assembly.
Figure 10:
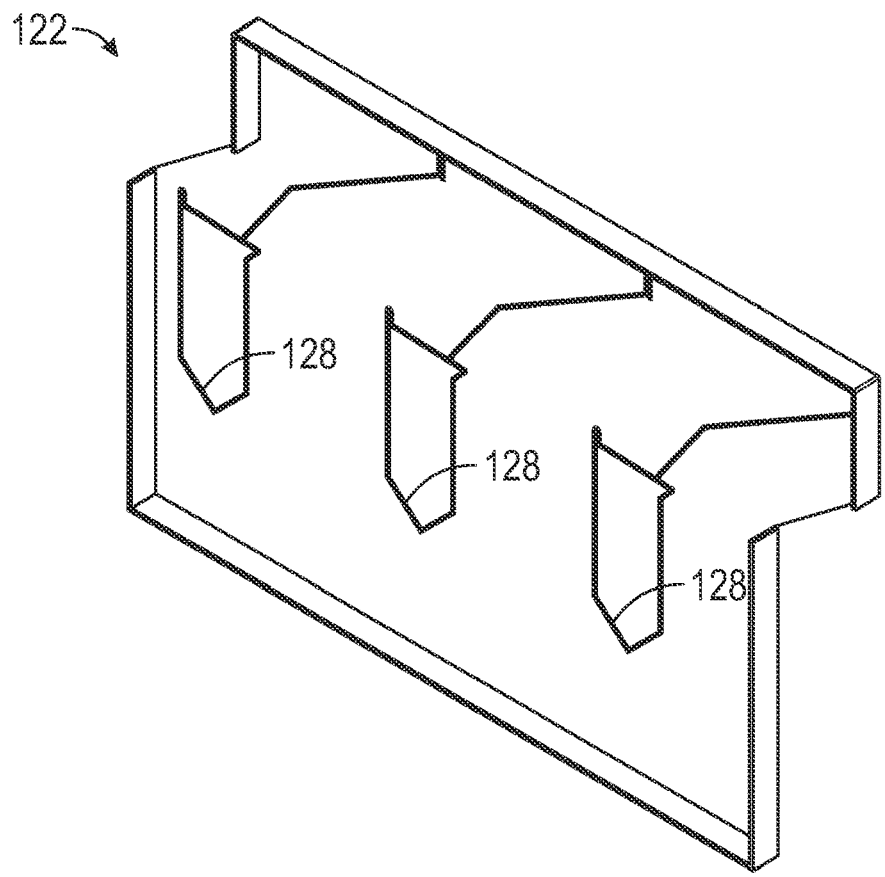
FIG. 10 is a perspective view of a second end plate of the liquid collection assembly.
Figure 11:
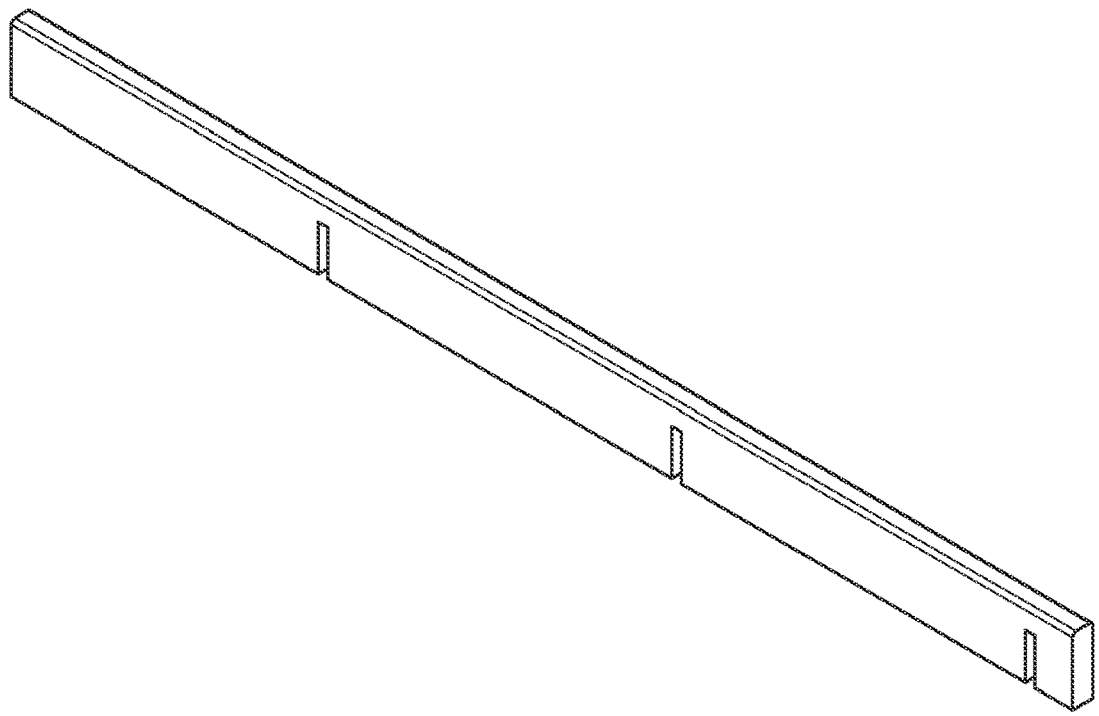
FIG. 11 is a perspective view of a cross support of the liquid collection assembly.

FIGS. 8A and 8B are schematic illustrations of the array of the trough assemblies 60. The air flowing from the fan assembly 22 encounters the lower end of the troughs 62 and passes through the gaps or plenums between the troughs 62 and the liquid diverter plates 64. In addition, the air flowing from the fan assembly 22 causes the damper plates 66 to move to the open position.

One of the advantageous of the inventive concepts disclosed herein is the increase and uniformity of the gaps between the trough assemblies 60 relative to the volume of the troughs 62. This enhances more efficient air to liquid mixtures which increases performance of the system. In addition, the uniformity of the gaps reduces the pressure drop from the lower end to the upper end of the liquid collection assembly 20. The reduced pressure drop also increases thermal performance of the cooling tower. An additional advantage is that there is a lower pressure drop because of the void of support structures in the gaps thus increasing the length of the flow space between adjacent ones of the trough assemblies 60. In one embedment of the liquid collection assembly 20, the effective width opening between adjacent trough assemblies 60 may be approximately four inches.

In one embodiment, the troughs 62 have a width of about 2.5 inches and spaced from the adjacent trough 62 about 8 inches. This provides a gap of about 5.5 inches between each trough 62. In one embodiment, the liquid diverter plates 64 are configured to have a spacing of about 4.25 inches between each adjacent liquid diverter plate 64 and the upper end 78 of the adjacent trough 62.

While the trough assemblies 60 are illustrated as being uniformly laterally spaced from one another, uniform spacing of the trough assemblies 60 is not mandatory. Depending upon the application or the specific shape of the housing, it is within the scope of the inventive concepts to vary the spacing between the trough assemblies 60 to direct air flow to specific areas. In addition, varying the size of the openings between adjacent surfaces will affect the air velocity between the adjacent surfaces. By varying the gap between them, air distribution may be better balanced throughout the system. However, the trough assemblies 60 should remain overlapped, so liquid cannot escape to the fans.

Figure 13:
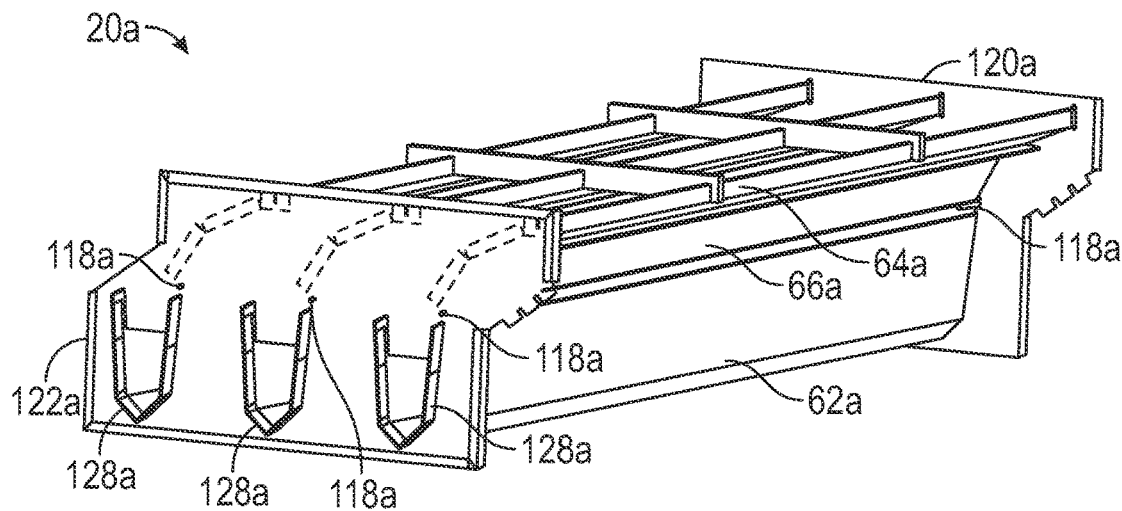
FIG. 13 is a perspective view of another embodiment of a liquid collection assembly constructed in accordance with the inventive concepts disclosed herein.

FIG. 13 illustrates another embodiment of a liquid collection assembly 20a constructed in accordance with the inventive concepts disclosed herein. The liquid collection assembly 20a is substantially similar to the liquid collection assembly 20, except as described herein below. The liquid collection assembly 20a may include a plurality of liquid collection assemblies 20a installed and removed in sections. In another version, the liquid collection assembly 20a may be formed as a single unit. Each of the liquid collection assemblies 20a includes a plurality of trough assemblies 60a supported in a spaced apart, vertically overlapping relationship to provide a path or plenum for rising air and to capture the down flowing liquid, to provide a barrier between the liquid distribution system, and the fan, and to carry the liquid into the at least one gutter.

Figure 14:
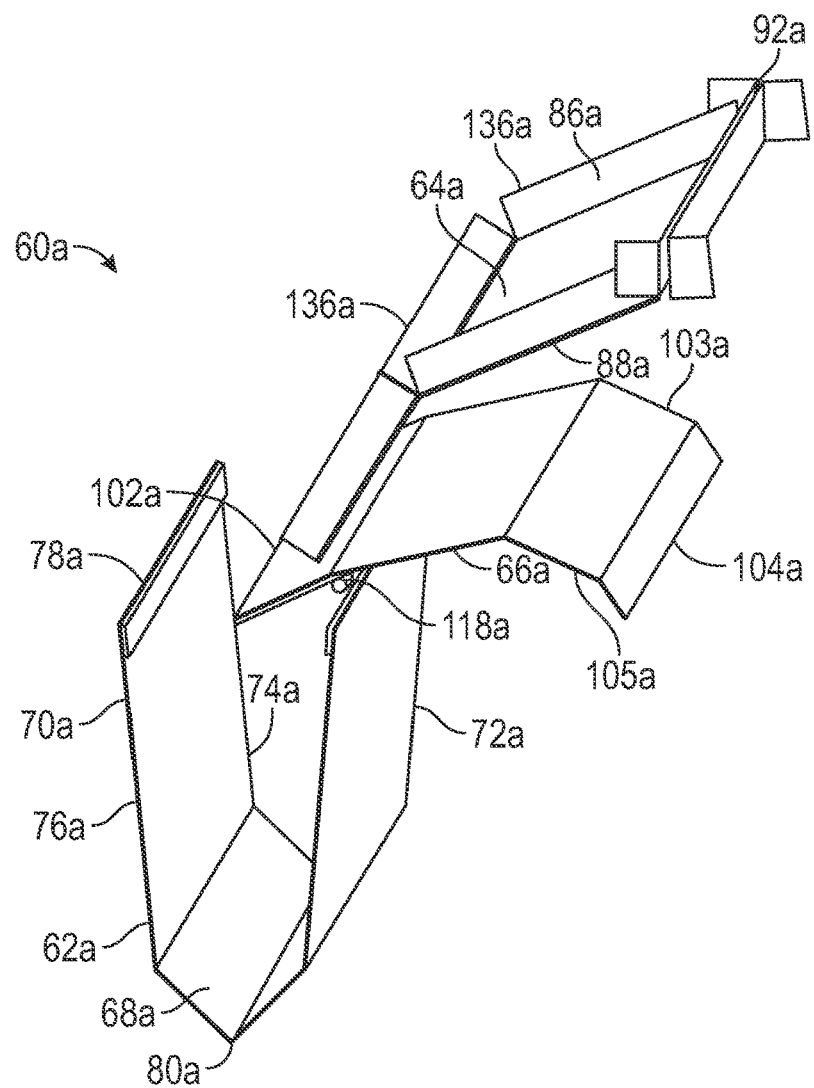
FIG. 14 is a perspective view of another embodiment of a trough assembly of the liquid collection assembly.
Figure 16:
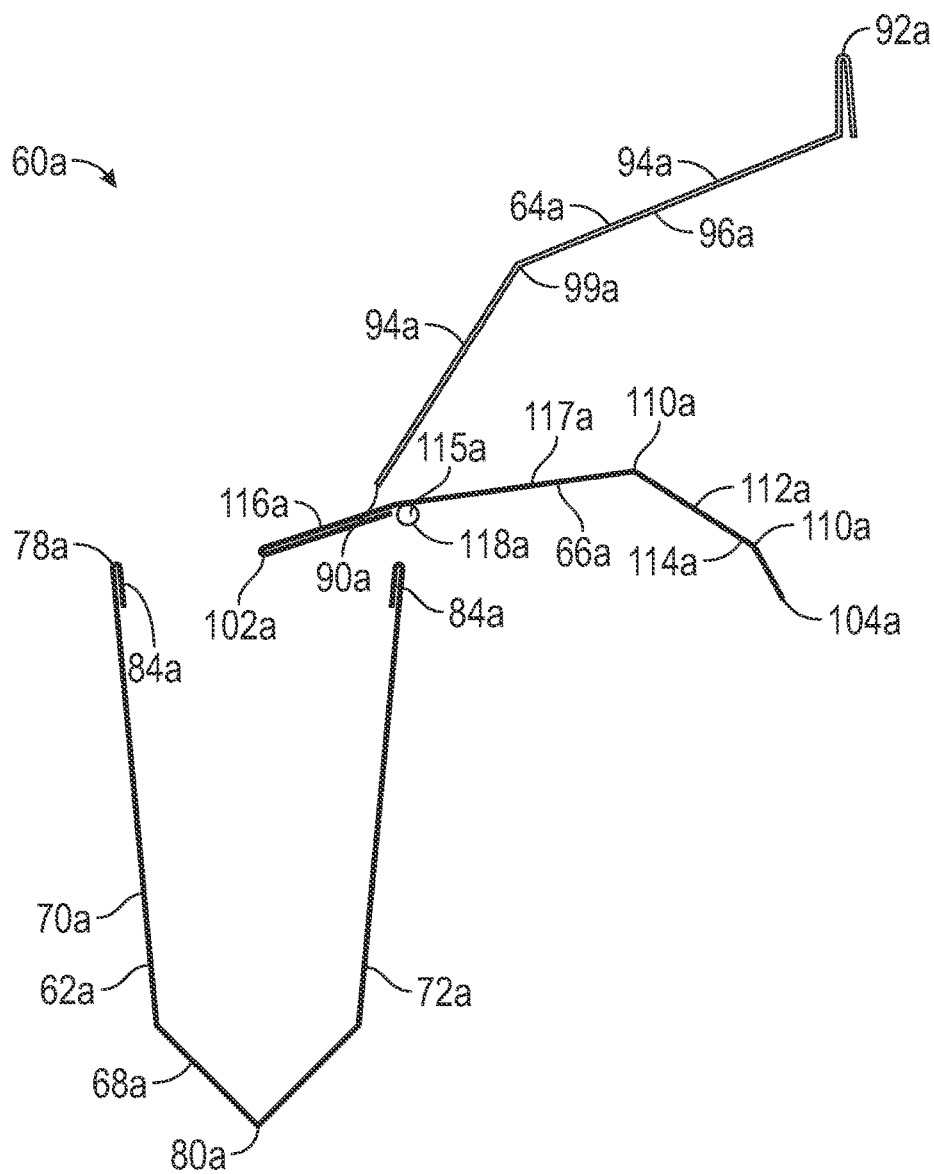
FIG. 16 is an end view of the trough assembly of FIG. 14.

Referring to FIGS. 14 and 16, the trough assembly 60a is substantially similar to the trough assembly 60, except as described herein below. In one embodiment, the trough assemblies 60a comprise a trough 62a, a liquid diverter plate 64a, and a damper plate 66a.

The trough 62a has a liquid receiving channel 68a, a first side 70a, a second side 72a, a first end 74a, a second end 76a, an upper end 78a, a lower end 80a. In one embodiment, the first side 70a and the second side 72a may have a bend 84a along the upper end 78a to increase structural integrity. The first side 70a of the trough 62a is substantially symmetrical with the second side 72a of the trough 62a with the upper end 78a of the first side 70a and the upper end 78a of the second side 72a extending an equal vertical distance from the lower end 80a.

The liquid diverter plate 64a has a first end 86a, a second end 88a, a proximal end 90a, a distal end 92a, an upper surface 94a, and a lower surface 96a. In one embodiment, the liquid diverter plate 64a is a separate component from the trough 62a with the proximal end 90a being spaced from the upper end 78 of the trough 62a to define a gap. The proximal end 90a of the liquid diverter plate 64a may be laterally positioned between the first side 70a and the second side 72a of the trough 62a with the liquid diverter plate 64a extending upwardly and laterally away from the trough 62a so liquid flowing onto to the upper surface 94a flows into the liquid receiving channel 68 of the trough. The distal end 92a is positioned vertically above an adjacent one of the troughs 62a. An intermediate portion of the liquid diverter plate 64a may have one or more longitudinal bends 99a. As an alternative to using brackets, the liquid diverter plate 64a further includes a series of liquid diverter plate tabs 136a extending perpendicular to the upper surface 94a along the first end 86a and the second end 88a.

Figure 15:
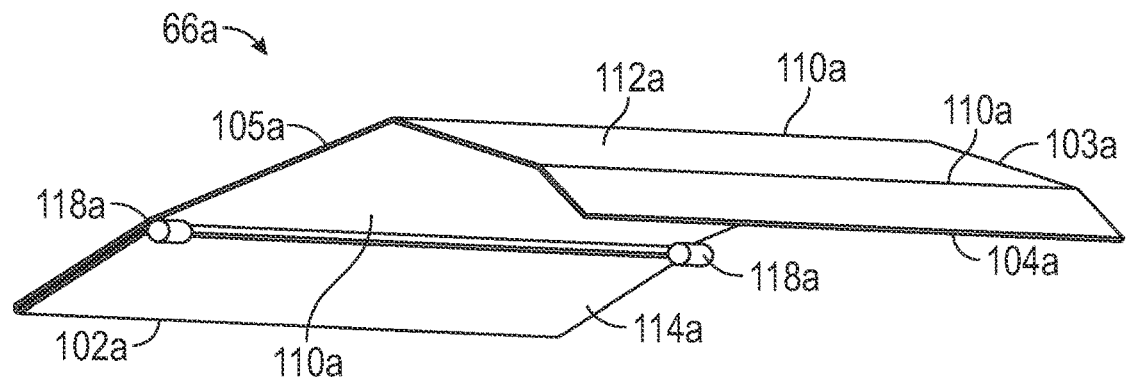
FIG. 15 is a perspective view of another damper plate of the trough assembly.
Figure 17A:
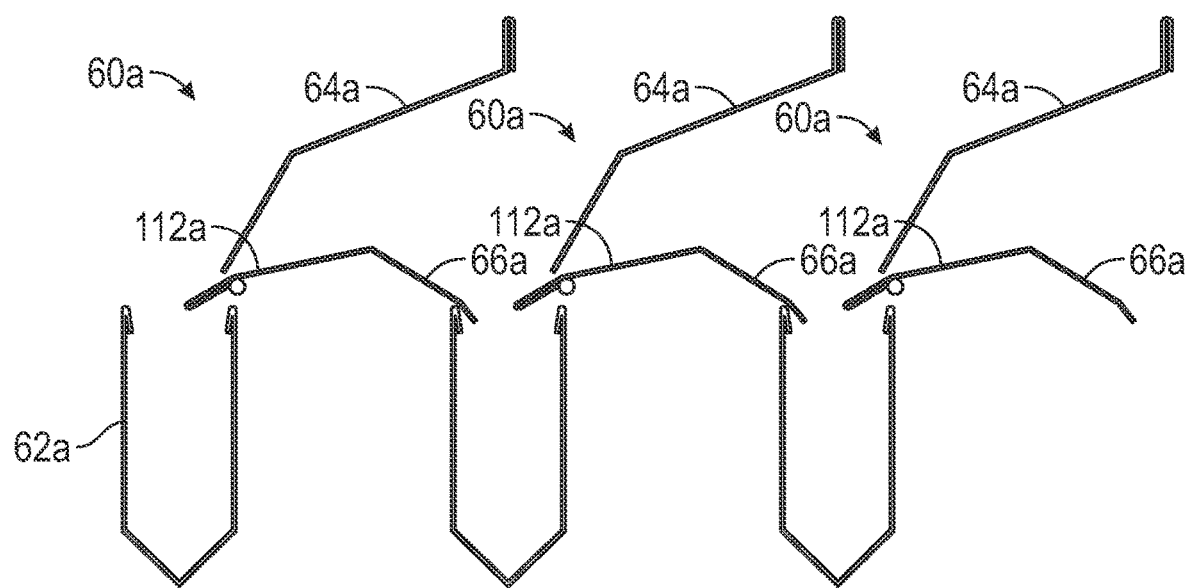
FIG. 17A is a sectional view of the liquid collection assembly of FIG. 13 illustrating the damper plates of the trough assemblies in a closed position.
Figure 17B:
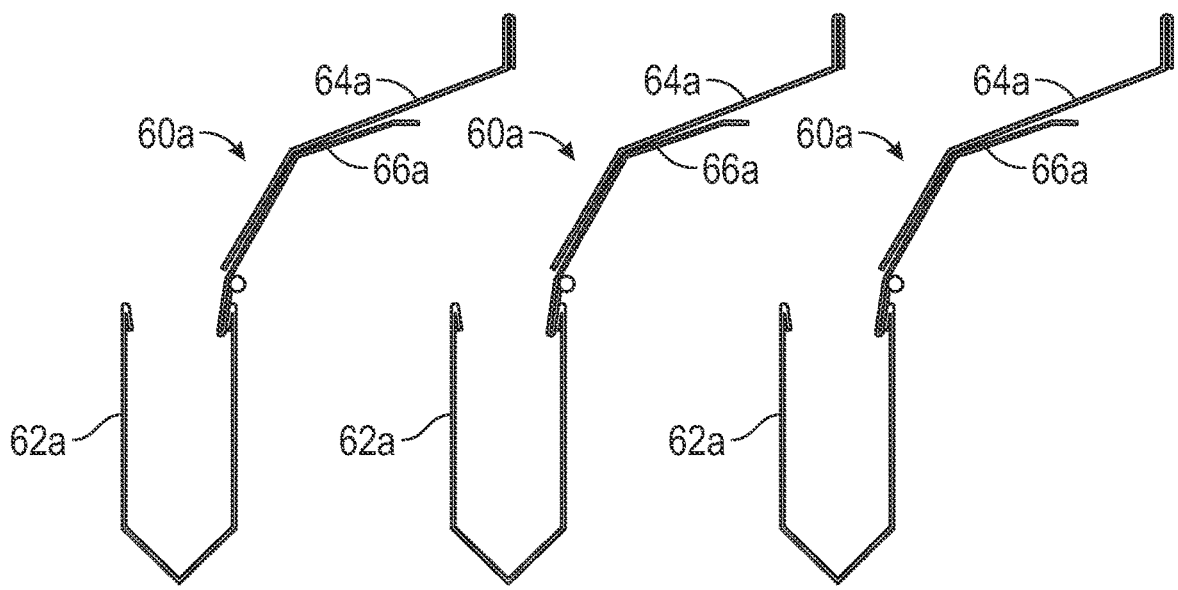
FIG. 17B is a sectional view of the liquid collection assembly of FIG. 13 illustrating the damper plates of the trough assemblies in an open position.

The damper plate 66a, as shown in FIG. 15, has a first end 103a, a second end 105a, a proximal end 102a, a distal end 104a, an upper surface 112a, and a lower surface 114a. The damper plate 66a extends laterally away from the second side of the trough and is rotatable about an axis of rotation 115a between a closed position (FIG. 17A) and an open position (FIG. 17B). In the closed position the damper plate 66a extends between the second side 72a of the trough 62a and the trough 62a of the adjacent one of the trough assemblies 60a to cover the space between the trough 62a and the adjacent trough 62a with the proximal end 102a of the damper plate 66a positioned adjacent the second side 72a of the trough 62a and the distal end 104a positioned adjacent the adjacent trough 62a. Any liquid flowing onto the upper surface 112a of the damper plate 66a flows into the liquid receiving channel 68 of the trough 62a or the adjacent trough 62a while the damper plate 66a is in the closed position. In the open position, the distal end 104a of the damper plate 66a is spaced from the adjacent trough 62a allowing air to flow upwardly between the trough 62a and the adjacent trough 62a.

The axis of rotation 115a is spaced from the proximal end 102a of the damper plate 66a toward the distal end 104a of the damper plate 66a. A first portion 116a of the damper plate 66a extends between the proximal end 102a of the damper plate 66a and the axis of rotation 115a and a second portion 117a of the damper plate 66a extends between the axis of rotation 115a and the distal end 104a of the damper plate 66a. The first portion 116a provides a counterbalance force to the second portion 117a to assist in moving the damper plate 66a from the closed position to the open position. The counterbalance force provided by the first portion 116a of the damper plate 66a is insufficient to cause the damper plate 66a to rotate to the open position when the fan assembly 22 is not operating. As upward air flow contacts the lower surface 114a of the damper plate 66a, the counterbalance force is sufficient to assist the damper plate 66a to rotate and remain in the open position when the fan assembly 22 is operating. The counterbalance force may be sufficient to reduce the amount of air flow required to cause the damper plate 66a to rotate and remain in the open position.

In one embodiment, the axis of rotation 115a is substantially vertically aligned with the second side 72a of the trough 62a. The first portion 116a may extend through the gap defined by the space between the proximal end 90a of the liquid diverter plate 64a and the upper end 78a of the trough 62a. The first portion 116a of the damper plate 66a may move within the gap as the damper plate 66a moves between the closed position and the open position. The damper plate 66a covers the gap when the damper plate 66a is in open position. In one embodiment, the first portion 116a extends above the trough 62a with the proximal end 102a of the damper plate 66a being laterally positioned between the first side 70a and the second side 72a, such that any liquid flowing onto the upper surface 112a of the first portion 116a of the damper plate 66a flows into the liquid receiving channel 68a of the trough 62a regardless of whether the damper plate 66a is in the closed position or the open position.

In one embodiment, the damper plate 66a may be pivotally coupled to the trough 62a with the axis of rotation 115a being substantially near the upper end 78a of the second side 72a of the trough 62a. In another embodiment, the damper plate 66a may be pivotally coupled to the liquid diverter plate 64a with the axis of rotation 115a being substantially near the proximal end 90a of the liquid diverter plate 64a.

The liquid collection assembly 20a further has a first end plate 120a attached to the first end 86a of the liquid diverter plate 64a and through which the first end 74a of the trough 62a extend; and a second end plate 122a attached the second end 88a of the liquid diverter plate 64a and through which the second end 76a of the trough 62a extend. The series of liquid diverter plate tabs 136a extending from the first end 86a and the second end 88a of the liquid diverter plate 64a may be secured to first end plate 120a and the second end plate 122a with fasteners, such as rivets. The liquid diverter plate 64a may be fluidically sealed relative to the first end plate 120a and the second end plate 122a the with a suitable sealant.

The first end plate 120a and the second end plate 122a have a plurality of openings 128a corresponding to the profile of the liquid receiving channels 68a of the troughs 62a. The troughs 62a are secured to the first end plate 120a and the second end plate 122a with suitable fasteners and/or fluid sealant or adhesive so liquid flowing along the liquid receiving channels 68a passes through the first end plate 120a or the second end plate 122a and into the gutter 44.

In one embodiment, the damper plate 66a may include a set of pins 118a defining the axis of rotation 115a and extending from the first end 103a and the second end 105a and extending through the first end plate 120a and the second end plate 122a, respectively, such that the damper plate is pivotally coupled to the first end plate 120a and the second end plate 122a. The first end 103a and the second end 105a may be substantially near the first end plate 120a and the second end plate 122a without causing interference of the damper plate 66a from freely moving between the closed position and the open position.

The proximal end 102a may have a bend to increase the structural integrity of the damper plate 66a and increasing the counterbalance force that is provided by the first portion 116a of the damper plate 66a. In one embodiment, additional weight may be added to the first portion 116a of the damper plate 66a further increasing the counterbalance force and reducing the amount of air flow required to cause the damper plate 66a to move to the open position.

The damper plate 66a may have one or more longitudinal bends 110a causing at least a portion of the damper plate 66a to conform to the contour of the liquid diverter plate 64a when the damper plate 66a is in the open position. In the closed position, the shape of the damper plate 66a causes liquid falling onto an upper surface 112a of the damper plate 66a to flow into either the trough 62a or the adjacent trough 62a. The shape further reduces the radius of travel of the damper plate 66a between the closed position and the open position.

Figure 18:
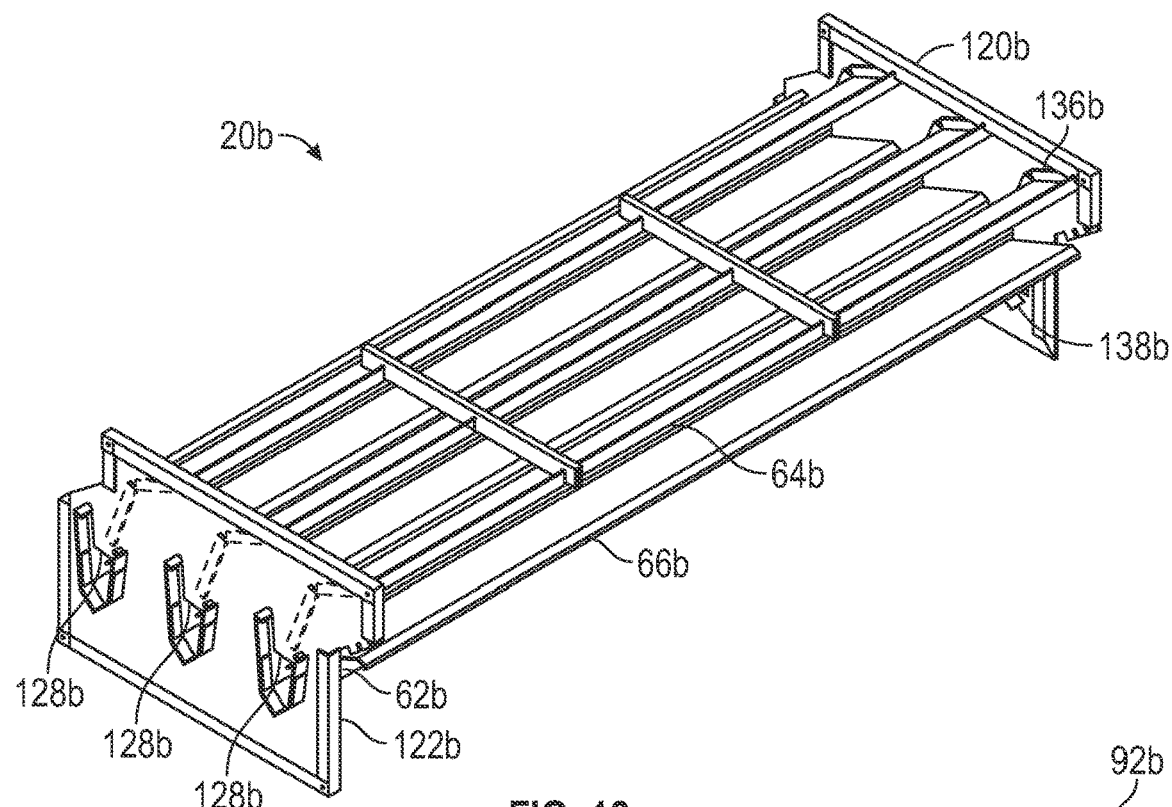
FIG. 18 is a perspective view of another embodiment of a liquid collection assembly constructed in accordance with the inventive concepts disclosed herein.

FIG. 18 illustrates another embodiment of a liquid collection assembly 20b constructed in accordance with the inventive concepts disclosed herein. The liquid collection assembly 20b is substantially similar to the liquid collection assembly 20 and liquid collection assembly 20a, except as described herein below. The liquid collection assembly 20b may include a plurality of liquid collection assemblies 20b installed and removed in sections. In another version, the liquid collection assembly 20b may be formed as a single unit. Each of the liquid collection assemblies 20b includes a plurality of trough assemblies 60b supported in a spaced apart, vertically overlapping relationship to provide a path or plenum for rising air and to capture the down flowing liquid, to provide a barrier between the liquid distribution system, and the fan, and to carry the liquid into the at least one gutter.

Figure 19:
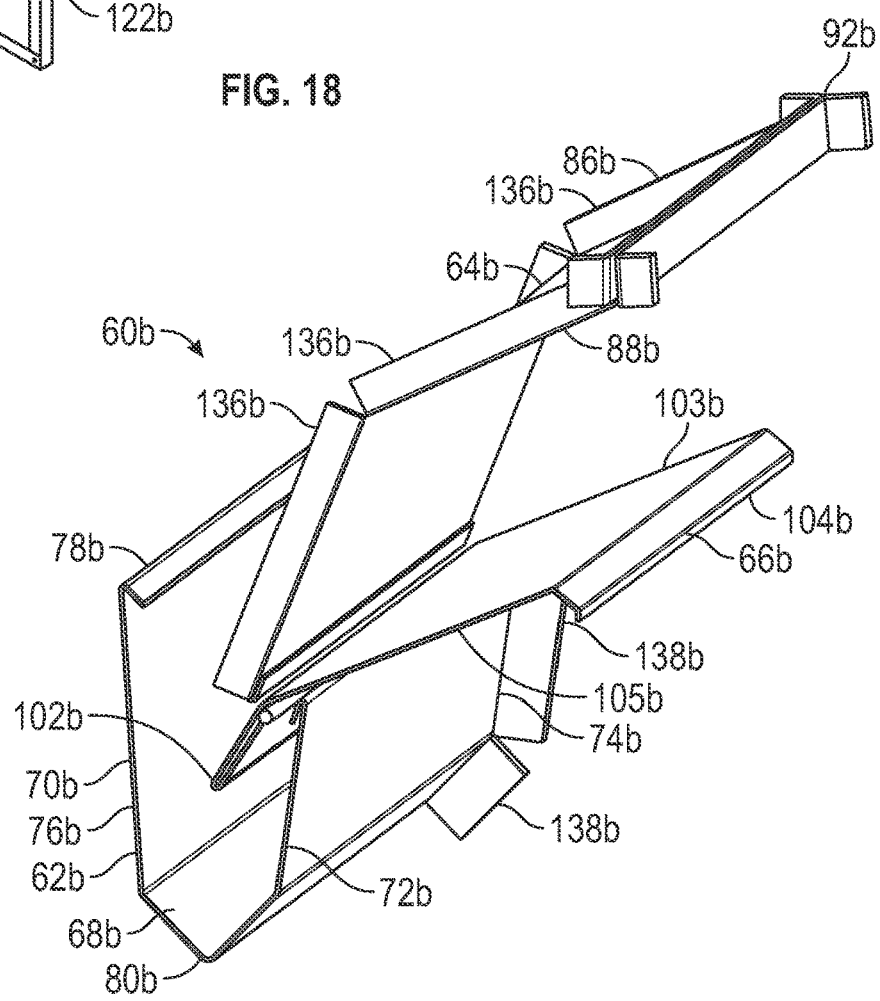
FIG. 19 is a perspective view of another embodiment of a trough assembly of the liquid collection assembly of FIG. 18.
Figure 21:
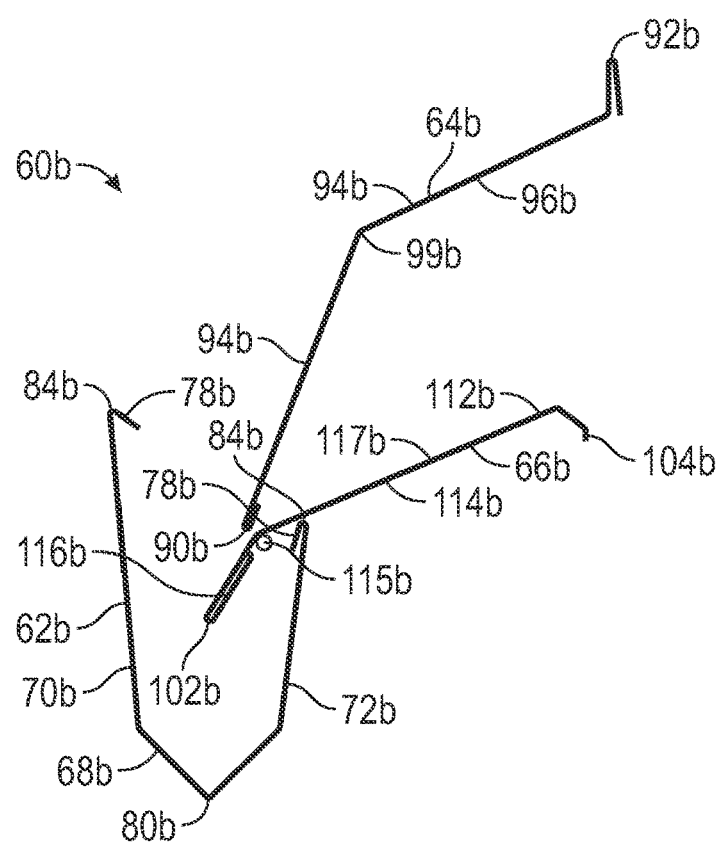
FIG. 21 is an end view of the trough assembly of FIG. 19.

Referring to FIGS. 19 and 21, the trough assembly 60b is substantially similar to the trough assembly 60 and the trough assembly 60a, except as described herein below. The trough assemblies 60b comprise a trough 62b, a liquid diverter plate 64b, and a damper plate 66b.

The trough 62b has a liquid receiving channel 68b, a first side 70b, a second side 72b, a first end 74b, a second end 76b, an upper end 78b, a lower end 80b. In one embodiment, the first side 70b and the second side 72b may have a bend 84a along the upper end 78b to increase structural integrity. The trough 62b further includes a series of trough tabs 138b extending perpendicular to the first side 70b and the second side 72b along the first end 74b of the trough 62b. The first side 70b of the trough 62b is substantially symmetrical with the second side 72b of the trough 62b; however, the second side 72b is shorter between the upper end 78b and the lower end 80b than the first side 70b of the trough 62b, such that the upper end 78 of the second side 72b is lower than the upper end of 78b of the first side 70b. Moreover, the upper end 78b of the second side 72b is lower than the upper end 78b of the first side 70b of the adjacent one of the troughs 62b.

The liquid diverter plate 64b is substantially similar to the liquid diverter plate 64a, except as described herein below. The liquid diverter plate 64b has a first end 86b, a second end 88b, a proximal end 90b, a distal end 92b, an upper surface 94b, and a lower surface 96b. The liquid diverter plate 64b is a separate component from the trough 62b with the proximal end 90b being spaced from the second side 72b of the trough 62b to define a gap. The proximal end 90b of the liquid diverter plate 64b is laterally positioned between the first side 70b and the second side 72b of the trough 62b. The proximal end 90b of the liquid diverter plate 64b is vertically positioned below the upper end 78b of the first side 70b and substantially vertically aligned with the upper end 78b of the second side 72b extending upwardly and laterally away from the trough 62b so liquid flowing onto to the upper surface 94b flows into the liquid receiving channel 68b of the trough. The distal end 92b is positioned vertically above an adjacent one of the troughs 62b. An intermediate portion of the liquid diverter plate 64b may have one or more longitudinal bends 99a. The liquid diverter plate 64b further includes a series of liquid diverter plate tabs 136b extending perpendicular to the upper surface 94b along the first end 86b and the second end 88b of the liquid diverter plate 64b.

Figure 20:
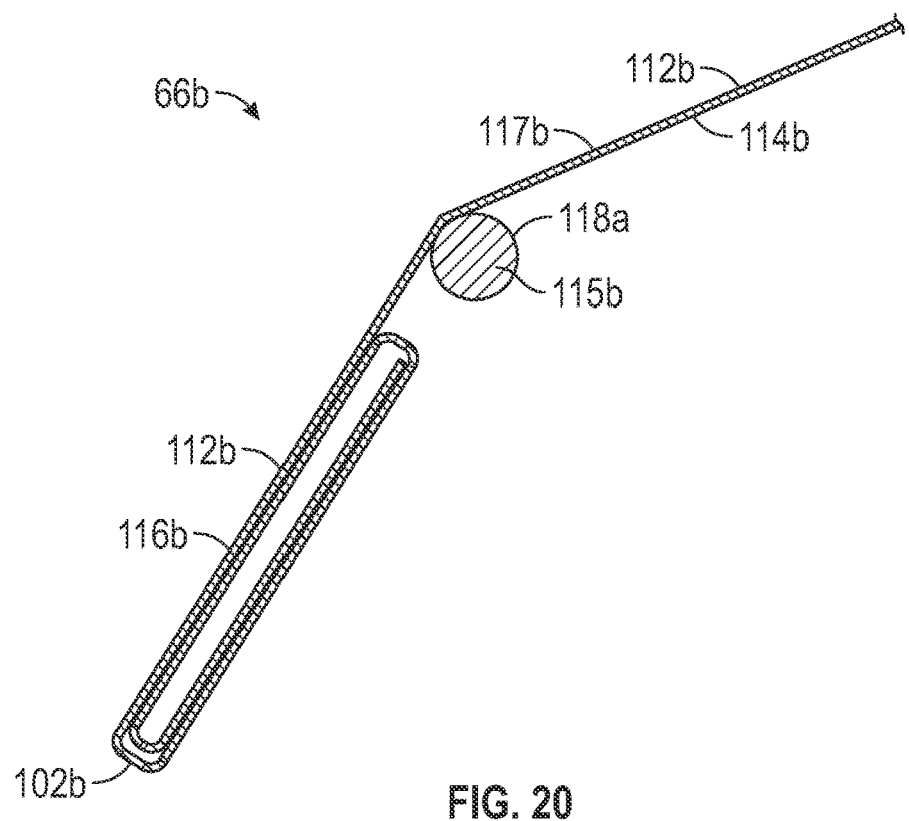
FIG. 20 is a fragmented, sectional view of a close up view of the first portion and an axis of rotation 115a of the damper plate of the trough assembly of FIG. 19.

The damper plate 66b, as shown in FIGS. 19-21, has a first end 103b, a second end 105b, a proximal end 102b, a distal end 104b, an upper surface 112b, and a lower surface 114b. The damper plate 66b is rotatable about an axis of rotation 115b between a closed position (FIG. 22A) and an open position (FIG. 22B).

The axis of rotation 115b is spaced from the proximal end 102b of the damper plate 66a toward the distal end 104b of the damper plate 66b. A first portion 116b of the damper plate 66b extends between the proximal end 102b of the damper plate 66b and the axis of rotation 115b and a second portion 117b of the damper plate 66b extends between the axis of rotation 115b and the distal end 104b of the damper plate 66b. The first portion 116b provides a counterbalance force to the second portion 117b to assist in moving the damper plate 66a from the closed position to the open position. The counterbalance force provided by the first portion 116b of the damper plate 66b is insufficient to cause the damper plate 66b to rotate to the open position when the fan assembly 22 is not operating. As upward air flow contacts the lower surface 114b of the damper plate 66b, the counterbalance force is sufficient to assist the damper plate 66b to rotate and remain in the open position when the fan assembly 22 is operating. The counterbalance force may be sufficient to reduce the amount of air flow required to cause the damper plate 66b to rotate and remain in the open position. In one embodiment, as shown in FIG. 20, the first portion 116b is coiled by a series of overlapping bends between the proximal end 102b and the axis of rotation 115b to increase the counterbalance force provided by the first portion 116b and reduce the length of the first portion 116b to fit within the liquid receiving channel 68b of the trough 62b.

The axis of rotation 115b may be positioned in the liquid receiving channel 68 with the axis of rotation 115b being vertically positioned slightly below the upper end 78b of the second side 72b of the trough 62b and laterally positioned adjacent the second side 72b of the trough 62b. The first portion 116b may extend from the axis of rotation 115b downwardly and laterally within the liquid receiving channel 68b and may move within the liquid receiving channel 68a as the damper plate 66a moves between the closed position and the open position. The second portion 117b may extend through the gap defined by the space between the proximal end 90b of the liquid diverter plate 64b and the upper end 78b of the trough 62b. The second portion 117b of the damper plate 66a may move within the gap as the damper plate 66a moves between the closed position and the open position. The damper plate 66b covers the gap when the damper plate 66a is in open position. In one embodiment, the first portion 116b extends below the liquid diverter plate 64b with the proximal end 102b of the damper plate 66b being laterally positioned between the first side 70b and the second side 72b, such that any liquid flowing onto the upper surface 112b of the first portion 116b of the damper plate 66b flows into the liquid receiving channel 68b of the trough 62*b* when the damper plate 66*a* is in the closed position. The axis of rotation 115*b* being positioned lower than the first side 70*b* of the trough 62*b* of the adjacent one of the trough assemblies 60*b* allows a smaller angle of rotation for the damper plate 66*b* between the close position and the open position. Hence, the arc length of the distal end 104*b* of the damper plate 66*b* will be shorter resulting is a faster transition between the close position and the open position and requiring less force to move the damper plate 66*b* to the open position.

Figure 22A:
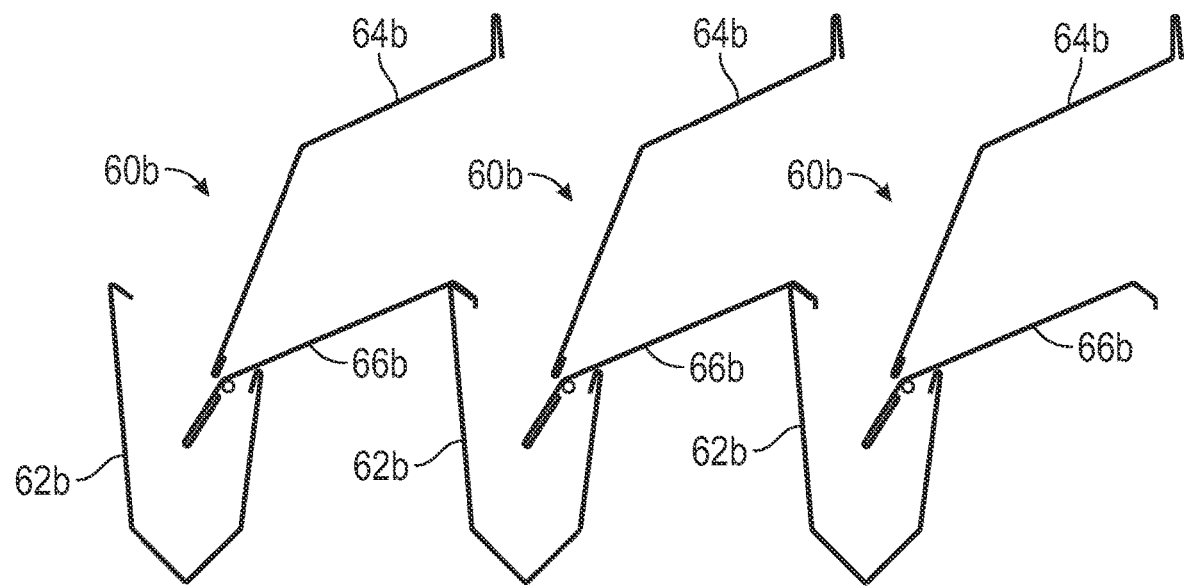
FIG. 22A is sectional view of the liquid collection assembly of FIG. 18 illustrating the damper plates of the trough assemblies in a closed position.
Figure 22B:
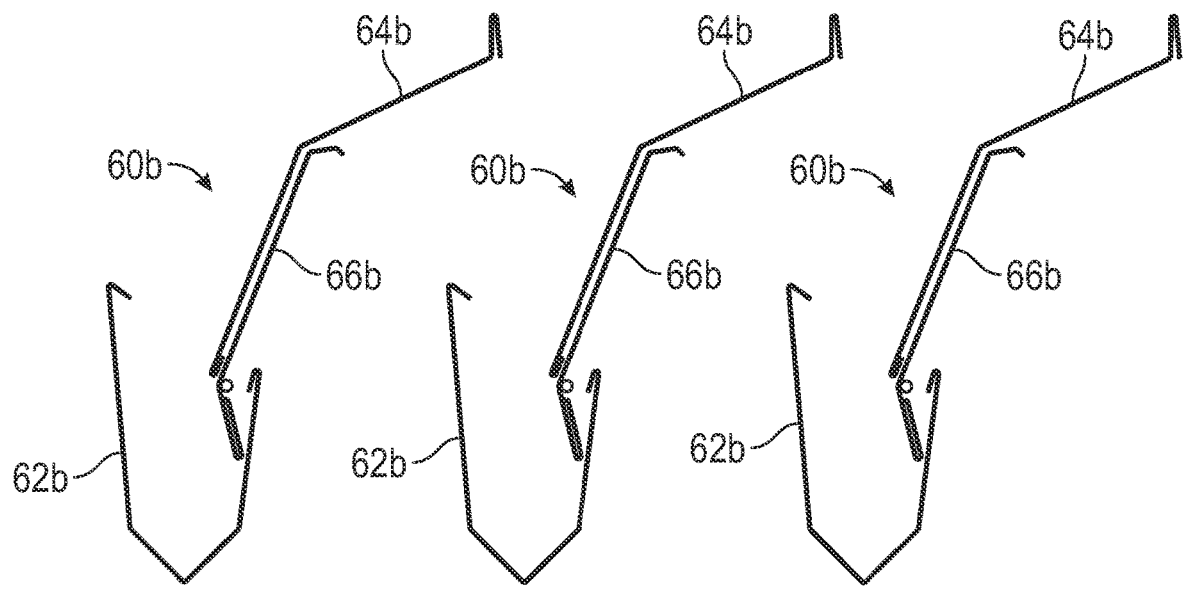
FIG. 22B is sectional view of the liquid collection assembly of FIG. 18 illustrating the damper plates of the trough assemblies in an open position.

Referring now to FIGS. 22A and 22*b*, In the closed position the damper plate 66*b* extends between the second side 72*b* of the trough 62*b* and the trough 62*b* of the adjacent one of the trough assemblies 60*b* to cover the space between the trough 62*b* and the adjacent trough 62*b* with the proximal end 102*b* of the damper plate 66*b* positioned within the trough 62*b* and the distal end 104*b* positioned adjacent the adjacent trough 62*b*. Any liquid flowing onto the upper surface 112*b* of the damper plate 66*b* flows into the liquid receiving channel 68*b* of the trough 62*b* or the adjacent trough 62*b* while the damper plate 66*b* is in the closed position. In the open position, the distal end 104*b* of the damper plate 66*b* is spaced from the adjacent trough 62*b* allowing air to flow upwardly between the trough 62*b* and the adjacent trough 62*b*. The position of the axis of rotation 115*b* relative to the liquid diverter plate 64*b* may further allow the second portion 117*b* of the damper plate 66*b* to better conform to contour of the lower surface 96*b* of the liquid diverter plate 64*b* when in the open position.

In one embodiment, the damper plate 66*b* may be pivotally coupled to the trough 62*b* with the axis of rotation 115*b* being substantially near the upper end 78*b* of the second side 72*b* of the trough 62*b*. In another embodiment, the damper plate 66*b* may be pivotally coupled to the liquid diverter plate 64*b* with the axis of rotation 115*b* being substantially near the proximal end 90*b* of the liquid diverter plate 64*b*.

The liquid collection assembly 20*b* further has a first end plate 120*b* attached to the first ends 86*b* of the liquid diverter plates 64*b* and the first ends 74*a* of the troughs 62*a*; and a second end plate 122*b* attached the second ends 88*b* of the liquid diverter plates 64*b* and through which the second ends 76*b* of the troughs 62*b* extend. The series of liquid diverter plate tabs 136*b* extending from the first ends 86*a* and the second ends 88*a* of the liquid diverter plates 64*b* and the series of trough tabs 138*b* extending from the first ends 74*a* may be secured to first end plate 120*b* and the second end plate 122*b* with fasteners, such as rivets. The liquid diverter plates 64*b* are fluidically sealed relative to the first end plate 120*b* and the second end plate 122*b* the with a suitable sealant.

The second end plate 122*b* has a plurality of openings 128*b* corresponding to the profile of the liquid receiving channels 68*b* of the troughs 62*b*. The second end 76*b* of the troughs 62*a* are secured to and the second end plate 122*b* with suitable fasteners and/or fluid sealant or adhesive so liquid flowing along the liquid receiving channels 68*b* passes through the second end plate 122*b* and into the gutter 44.

Although the inventive concepts have been illustrated and described in connection with compact, transportable cooling towers, the inventive concepts disclosed herein are equally adapted to use in fluid coolers. In fluid coolers liquid is passed countercurrent across a coil (i.e., heat exchanger) carrying a liquid to be cooled. Also, although the liquid collection assembly 20 has been illustrated and described in connection with compact, transportable cooling towers with bottom fan assemblies, the liquid collection assembly 20 may be used in more conventional systems having conventional liquid sumps or basins below the liquid cooler or fill media.

The inventive concepts disclosed provide several major improvements. The liquid collection assembly 20 collects the down coming liquid, but also directs and diffuses the up flowing air so that all the fill media gets substantially equal air flow across the entire surface of the heat exchanger or fill media. This enhances more efficient air to liquid mixtures which increases performance of the system. In addition, the design of the liquid collection assemblies reduces the pressure drop across the surface elements, as compared to existing technology. The reduced pressure drop also increases thermal performance of the cooling tower. The liquid collection assembly 20 is relatively simple and economical to manufacture.

From the above description, it is clear that the inventive concepts disclosed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed.

What is claimed is:

1. A liquid collection assembly positionable between a fill material and a fan for collecting liquid gravitating through the fill material while allowing air to pass up to the fill material, the liquid collection assembly comprising:

a plurality of trough assemblies supported in a spaced apart, vertically overlapping relationship to define a plenum between adjacent trough assemblies and to capture the down flowing liquid, to provide a barrier between the fill material and the fan, and to carry the liquid into at least one gutter, at least a portion of the trough assemblies comprising:

a trough having a liquid receiving channel, a first side, a second side, a first end, a second end, and upper end, and a lower end;

a liquid diverter plate having a first end, a second end, a proximal end, a distal end, an upper surface, and a lower surface, the liquid diverter plate extending upwardly and laterally away from the trough so liquid flowing onto the upper surface flows into the trough, the distal end of the liquid diverter plate positioned vertically above a trough of an adjacent one of the trough assemblies; and a damper plate having a first end, a second end, a proximal end, a distal end, an upper surface, and a lower surface, the damper plate extending laterally away from the second side of the trough and rotatable about an axis of rotation between a closed position wherein the damper plate extends between the second side of the trough and the trough of the adjacent one of the trough assemblies to cover the space between the trough and the adjacent trough with the proximal end of the damper plate positioned adjacent the second side of the trough and the distal end positioned adjacent the adjacent trough and an open position wherein the distal end of the damper plate is spaced from the adjacent trough, the axis of rotation being spaced from the proximal end of the damper plate toward the distal end of the damper plate so a first portion of the damper plate extends between the proximal end of the damper plate and the axis of rotation and a second portion of the damper plate extends between the axis of rotation and the distal end of the damper plate in a way that the first portion provides a counterbalance force to the second portion to assist in moving the damper plate from the closed position to the open position,
wherein the second side of the trough is shorter between the upper end and the lower end than the first side of the trough, and wherein the axis of rotation is positioned in the liquid receiving channel of the trough and adjacent the second side of the trough;
a first end plate attached to the first end of the trough and the first end of the liquid diverter plate; and
a second end plate through which the second end of the trough and the second end of the liquid diverter plate extend, the second end plate having a plurality of openings corresponding to the liquid receiving channels of the troughs.

2. The assembly of claim 1, wherein the first portion of the damper plate has at least one longitudinal bend defining the proximal end.

3. The assembly of claim 1, wherein the damper plate is pivotally coupled to the first end plate and the second end plate.

4. The assembly of claim 3, wherein the proximal end of the liquid diverter plate is spaced from the upper end of the trough to define a gap, and wherein the first portion of the damper plate moves in the gap as the damper plate moves between the closed position and the open position.

5. The assembly of claim 4, wherein the damper plate covers the gap when the damper plate is in the open position.

6. An apparatus, comprising:
a housing having at least one gutter;
a body of fill material disposed in the housing;
a liquid distribution system disposed in the housing and positioned above the fill material for distributing liquid on top of the fill material so the liquid gravitates downward through the fill material;
a fan positioned below the body of fill material for blowing air upward through the fill material; and
a liquid collection assembly positioned between the fill material and the fan for collecting the liquid gravitating through the fill material while allowing air to pass up to the fill material, the liquid collection assembly comprising:
a plurality of trough assemblies supported in a spaced apart, vertically overlapping relationship to define a plenum between adjacent trough assemblies and to capture the down flowing liquid, to provide a barrier between the liquid distribution system and the fan, and to carry the liquid into the at least one gutter, at least a portion of the trough assemblies comprising:
a trough having a liquid receiving channel, a first side, a second side, a first end, a second end, and upper end, and a lower end;
a liquid diverter plate having a first end, a second end, a proximal end, a distal end, an upper surface, and a lower surface, the liquid diverter plate extending upwardly and laterally away from the trough so liquid flowing onto the upper surface flows into the trough, the distal end of the liquid diverter plate positioned vertically above a trough of an adjacent one of the trough assemblies; and
a damper plate having a first end, a second end, a proximal end, a distal end, an upper surface, and a lower surface, the damper plate extending laterally away from the second side of the trough and rotatable about an axis of rotation between a closed position wherein the damper plate extends between the second side of the trough and the trough of the adjacent one of the trough assemblies to cover the space between the trough and the adjacent trough with the proximal end of the damper plate positioned adjacent the second side of the trough and the distal end positioned adjacent the adjacent trough and an open position wherein the distal end of the damper plate is spaced from the adjacent trough, the axis of rotation being spaced from the proximal end of the damper plate toward the distal end of the damper plate so a first portion of the damper plate extends between the proximal end of the damper plate and the axis of rotation and a second portion of the damper plate extends between the axis of rotation and the distal end of the damper plate in a way that the first portion provides a counterbalance force to the second portion to assist in moving the damper plate from the closed position to the open position,
wherein the second side of the trough is shorter between the upper end and the lower end than the first side of the trough, and wherein the axis of rotation is positioned in the liquid receiving channel of the trough and adjacent the second side of the trough;
a first end plate attached to the first end of the trough and the first end of the liquid diverter plate; and
a second end plate through which the second end of the trough and the second end of the liquid diverter plate extend, the second end plate having a plurality of openings corresponding to the liquid receiving channels of the troughs.

7. The apparatus of claim 6, wherein the first portion of the damper plate has at least one longitudinal bend defining the proximal end.

8. The apparatus of claim 6, wherein the damper plate is pivotally coupled to the first end plate and the second end plate.

9. The apparatus of claim 8, wherein the proximal end of the liquid diverter plate is spaced from the upper end of the trough to define a gap, and wherein the first portion of the damper plate moves in the gap as the damper plate moves between the closed position and the open position.

10. The apparatus of claim 9, wherein the damper plate covers the gap when the damper plate is in the open position.

11. A liquid collection assembly positionable between a fill material and a fan for collecting liquid gravitating through the fill material while allowing air to pass up to the fill material, the liquid collection assembly comprising:
a plurality of trough assemblies supported in a spaced apart, vertically overlapping relationship to define a plenum between adjacent trough assemblies and to capture the down flowing liquid, to provide a barrier between the fill material and the fan, and to carry the liquid into at least one gutter, at least a portion of the trough assemblies comprising:
a trough having a liquid receiving channel, a first side, a second side, a first end, a second end, and upper end, and a lower end; and
a liquid diverter plate having a first end, a second end, a proximal end, a distal end, an upper surface, and a lower surface, the liquid diverter plate extending upwardly and laterally away from the trough so liquid flowing onto the upper surface flows into the trough, the distal end of the liquid diverter plate positioned vertically above a trough of an adjacent one of the trough assemblies;

a damper plate having a first end, a second end, a proximal end, a distal end, an upper surface, and a lower surface, the damper plate extending laterally away from the second side of the trough and rotatable about an axis of rotation between a closed position wherein the damper plate extends between the second side of the trough and the trough of the adjacent one of the trough assemblies to cover the space between the trough and the adjacent trough with the proximal end of the damper plate positioned adjacent the second side of the trough and the distal end positioned adjacent the adjacent trough and an open position wherein the distal end of the damper plate is spaced from the adjacent trough, the axis of rotation being spaced from the proximal end of the damper plate toward the distal end of the damper plate so a first portion of the damper plate extends between the proximal end of the damper plate and the axis of rotation and a second portion of the damper plate extends between the axis of rotation and the distal end of the damper plate in a way that the first portion provides a counterbalance force to the second portion to assist in moving the damper plate from the closed position to the open position, wherein the proximal end of the liquid diverter plate is spaced from the upper end of the trough to define a gap, and wherein the first portion of the damper plate moves in the gap as the damper plate moves between the closed position and the open position;

a first end plate attached to the first end of the trough and the first end of the liquid diverter plate; and a second end plate through which the second end of the trough and the second end of the liquid diverter plate extend, the second end plate having a plurality of openings corresponding to the liquid receiving channels of the troughs.

12. The assembly of claim 11, wherein the axis of rotation is substantially vertically aligned with the second side of the trough.

13. The assembly of claim 11, wherein the damper plate covers the gap when the damper plate is in the open position.

14. The assembly of claim 13, wherein at least a portion of the damper plate substantially conforms to the contour of the liquid diverter plate when the damper plate is in the open position.

15. An apparatus, comprising:

a housing having at least one gutter;

a body of fill material disposed in the housing;

a liquid distribution system disposed in the housing and positioned above the fill material for distributing liquid on top of the fill material so the liquid gravitates downward through the fill material;

a fan positioned below the body of fill material for blowing air upward through the fill material; and a liquid collection assembly positioned between the fill material and the fan for collecting the liquid gravitating through the fill material while allowing air to pass up to the fill material, the liquid collection assembly comprising:

a plurality of trough assemblies supported in a spaced apart, vertically overlapping relationship to define a plenum between adjacent trough assemblies and to capture the down flowing liquid, to provide a barrier between the liquid distribution system and the fan, and to carry the liquid into the at least one gutter, at least a portion of the trough assemblies comprising:

a trough having a liquid receiving channel, a first side, a second side, a first end, a second end, and upper end, and a lower end;

a liquid diverter plate having a first end, a second end, a proximal end, a distal end, an upper surface, and a lower surface, the liquid diverter plate extending upwardly and laterally away from the trough so liquid flowing onto the upper surface flows into the trough, the distal end of the liquid diverter plate positioned vertically above a trough of an adjacent one of the trough assemblies; and a damper plate having a first end, a second end, a proximal end, a distal end, an upper surface, and a lower surface, the damper plate extending laterally away from the second side of the trough and rotatable about an axis of rotation between a closed position wherein the damper plate extends between the second side of the trough and the trough of the adjacent one of the trough assemblies to cover the space between the trough and the adjacent trough with the proximal end of the damper plate positioned adjacent the second side of the trough and the distal end positioned adjacent the adjacent trough and an open position wherein the distal end of the damper plate is spaced from the adjacent trough, the axis of rotation being spaced from the proximal end of the damper plate toward the distal end of the damper plate so a first portion of the damper plate extends between the proximal end of the damper plate and the axis of rotation and a second portion of the damper plate extends between the axis of rotation and the distal end of the damper plate in a way that the first portion provides a counterbalance force to the second portion to assist in moving the damper plate from the closed position to the open position, wherein the proximal end of the liquid diverter plate is spaced from the upper end of the trough to define a gap, and wherein the first portion of the damper plate moves in the gap as the damper plate moves between the closed position and the open position;

a first end plate attached to the first end of the trough and the first end of the liquid diverter plate; and a second end plate through which the second end of the trough and the second end of the liquid diverter plate extend, the second end plate having a plurality of openings corresponding to the liquid receiving channels of the troughs.

16. The apparatus of claim 15, wherein the axis of rotation is substantially vertically aligned with the second side of the trough.

17. The apparatus of claim 15, wherein the damper plate covers the gap when the damper plate is in the open position.

18. The apparatus of claim 17, wherein at least a portion of the damper plate substantially conforms to the contour of the liquid diverter plate when the damper plate is in the open position.

* * * * *